(12) United States Patent
Wall et al.

(10) Patent No.: US 12,044,773 B2
(45) Date of Patent: Jul. 23, 2024

(54) MULTIMODE ELECTRONICALLY STEERABLE MONOPULSE RADAR

(71) Applicant: The Boeing Company, Chicago, IL (US)

(72) Inventors: Walter S. Wall, Calabasas, CA (US); Jonathan J. Lynch, Oxnard, CA (US); James D. Krieger, Woodland Hills, CA (US)

(73) Assignee: The Boeing Company, Arlington, VA (US)

( * ) Notice: Subject to any disclaimer, the term of this patent is extended or adjusted under 35 U.S.C. 154(b) by 394 days.

(21) Appl. No.: 17/569,536

(22) Filed: Jan. 6, 2022

(65) Prior Publication Data
US 2023/0213644 A1    Jul. 6, 2023

(51) Int. Cl.
*G01S 13/66* (2006.01)
*G01S 7/282* (2006.01)
(Continued)

(52) U.S. Cl.
CPC .......... *G01S 13/872* (2013.01); *G01S 7/282* (2013.01); *G01S 7/285* (2013.01); *G01S 7/352* (2013.01); *G01S 13/66* (2013.01)

(58) Field of Classification Search
CPC ........ G01S 13/872; G01S 7/282; G01S 7/285; G01S 7/352; G01S 13/66; G01S 7/034;
(Continued)

(56) References Cited

U.S. PATENT DOCUMENTS

| 9,128,189 B1 * | 9/2015 | West .......................... G01S 7/03 |
| 9,194,946 B1 | 11/2015 | Vacanti |

(Continued)

FOREIGN PATENT DOCUMENTS

| CN | 116636006 A * | 8/2023 | ............. H01L 24/13 |
| DE | 202021101429 U1 * | 8/2021 | ......... H01L 25/0652 |

OTHER PUBLICATIONS

Raytheon NSC Radar Service and Installation Manual (Year: 2005).*
(Continued)

*Primary Examiner* — Vladimir Magloire
*Assistant Examiner* — Remash R Guyah
(74) *Attorney, Agent, or Firm* — Ostrager Chong Flaherty & Broitman P.C.

(57) ABSTRACT

An electronically steerable phased array and switching network connected to an FMCW radar transceiver to enable a low-cost monopulse tracking system that covers a wide field of regard using electronic beam steering. In a first mode, beamformer integrated circuits (BFICs) at each element in the array are switched synchronously with transmit/receive (T/R) switches located at the subarray level. This allows the entire aperture to be switched between transmission and reception, enabling the FMCW radar transceiver to be operated in a pulsed configuration. In a second mode, a portion of the T/R switches at the subarray level and all of the connecting BFICs at the element level are fixed in either transmitting or receiving mode, allowing separate portions of the aperture to concurrently transmit or receive. The arrangement of transmitting and receiving subarrays can be dynamically reconfigured to allow for accurate bearing and azimuth estimation using alternating monopulse.

20 Claims, 17 Drawing Sheets

(51) Int. Cl.
    *G01S 7/285*      (2006.01)
    *G01S 7/35*       (2006.01)
    *G01S 13/87*      (2006.01)

(58) Field of Classification Search
    CPC ............... G01S 13/343; G01S 13/4454; G01S
              13/4463; G01S 7/03; G01S 13/931; G01S
                                                2013/0254
    USPC .................................................... 342/43, 201
    See application file for complete search history.

(56) References Cited

U.S. PATENT DOCUMENTS

| | | |
|---|---|---|
| 9,618,605 B2 | 4/2017 | Johnson et al. |
| 10,324,166 B2 | 6/2019 | West et al. |
| 2009/0121926 A1 | 5/2009 | Iverson |
| 2013/0169468 A1 | 7/2013 | Johnson et al. |
| 2015/0285897 A1 | 10/2015 | Kilty et al. |
| 2018/0321368 A1 | 11/2018 | Bharadwaj et al. |
| 2022/0196821 A1* | 6/2022 | Amadjikpe ............ G01S 13/881 |
| 2022/0413090 A1* | 12/2022 | Harkins .................. G01S 7/027 |
| 2023/0121099 A1* | 4/2023 | Gostyuzhev .............. H04L 5/14 455/78 |

OTHER PUBLICATIONS

Furuno Installation Manual—Marine Radae Model FAR-2218(-BB)/2228(-BB/-NXT/-NXT-BB)/FAR-2318/2328(-NXT)/FAR-2238S(-BB/-NXT/-NXT-BB)/FAR-2338S(-NXT)/2328W/2338SW/2258(-BB)/2358 (Year: 2017).*

* cited by examiner

MULTIMODE ELECTRONICALLY STEERABLE MONOPULSE RADAR

BACKGROUND

The technology disclosed herein generally relates to radar systems that operate at both near and far ranges and, in particular, relates to radar systems which are capable of operating in either a frequency modulation continuous wave (FMCW) mode (for short ranges) or a pulsed mode (for long ranges).

Both pulsed and FMCW radars are well known. FMCW radars, which are typically used for short-range sensing applications, are currently being produced in high volumes for automotive and autonomy applications, enabling very low unit costs. Pulsed radars are better suited for long-range applications but are not currently produced in large volumes, requiring expensive engineering costs to design them anew for each specific application. Some radar systems are able to operate in both FMCW and pulsed modes to achieve the benefits of FMCW operation at short range and pulsed mode operation at long range. In some situations, it would be advantageous to convert an existing low-cost FMCW radar transceiver into a pulsed radar system.

FMCW radars are widely used in emerging automotive and autonomy applications, making their unit costs much lower than traditional low-volume pulsed radars for long-range military applications. Furthermore, beamformer integrated circuits (BFICs) intended for 5G and SATCOM applications are being produced in large volumes, driving their unit costs down as well. A method for integrating off-the-shelf BFICs and an external switching network into existing FMCW radar transceivers to enable a multimode electronically steerable monopulse radar would be advantageous. By converting a low-cost "off-the-shelf" FMCW radar transceiver into an electronically steerable pulsed radar system, the non-recurring engineering costs associated with custom radiofrequency radio frequency (RF) monolithic microwave integrated circuit (MMIC) design can be avoided, dramatically reducing the cost of the system.

The development and material costs associated with phased array radar systems are typically high due to the low production volumes. Therefore, using commercial off-the-shelf (COTS) parts, such as BFICs, developed for alternative high-volume markets such as SATCOM and 5G communications, to augment the capability of low-cost automotive radar transceivers has the potential to enable phased array radar at much lower costs. In particular, there is a need for a switching network implementation that allows COTS BFICs to be easily integrated with COTS radar transceivers to enable low-cost electronically steerable multimode monopulse radar operation.

SUMMARY

The subject matter disclosed in some detail below is a retrofit system applied to existing FMCW radars in order to convert an existing FMCW radar transceiver into a low-cost electronically steerable monopulse radar with both pulsed and FMCW modes. While designs and methods for producing low-cost BFICs and multimode radar transceivers have been previously discussed in the literature, it is not obvious how to integrate these technologies in a way that preserves their low-cost nature and allows for high-performance multimode radar operation.

The technological advances proposed herein include an electronically steerable phased array and switching network connected to an FMCW radar transceiver to enable a low-cost monopulse tracking system that covers a wide field of regard using electronic beam steering. In a first mode, beamformer integrated circuits (BFICs) at each element in the array are switched synchronously with transmit/receive (T/R) switches located at the subarray level. This allows the entire aperture to be switched between transmission and reception, enabling the FMCW radar transceiver to be operated in a pulsed configuration. In a second mode, a portion of the T/R switches at the subarray level and all of the connecting BFICs at the element level are fixed in either transmitting or receiving mode, allowing separate portions of the aperture to concurrently transmit or receive. The arrangement of transmitting and receiving subarrays can be dynamically reconfigured to allow for accurate bearing and azimuth estimation using alternating monopulse.

Although electronically steerable monopulse radar systems with both pulsed and FMCW modes will be described in some detail below, one or more of those embodiments may be characterized by one or more of the following aspects.

One aspect of the subject matter disclosed in some detail below is method for retrofitting an electronically steerable frequency modulation continuous wave (FMCW) radar system, the method comprising: (a) disconnecting an antenna from the FMCW radar transceiver; (b) connecting a retrofit transmit/receive module comprising a plurality of single-pole double-throw (SPDT) switches and a plurality of beam-forming integrated circuits (BFICs) to the FMCW radar transceiver, each BFIC being connected in series with a corresponding SPDT switch; and (c) connecting the antenna to the retrofit transmit/receive module. Step (b) comprises connecting one port of each SPDT switch to a transmitter and another port of each SPDT switch to a receiver of the FMCW radar transceiver. Step (c) comprises connecting each BFIC to a respective set of antenna elements of the antenna.

Another aspect of the subject matter disclosed in some detail below is a radar system comprising a FMCW radar transceiver, a retrofit transmit/receive module connected to the FMCW radar transceiver, and an antenna connected to the retrofit transmit/receive module, wherein: the FMCW radar transceiver comprises a transmitter, a receiver connected to the transmitter, analog-to-digital converters connected to the receiver, a digital signal processor connected to the analog-to-digital converters, and a microcontroller connected to the digital signal processor and to the transmitter; the antenna comprises an array of antenna elements, the array of antenna elements being arranged to form first through fourth quadrants; and the retrofit transmit/receive module comprises first through fourth SPDT switches which are connected to the transmitter and to the receiver, and first through fourth BFICs which are respectively connected to the first through fourth SPDT switches and to the antenna elements of the first through fourth quadrants.

A further aspect of the subject matter disclosed in some detail below is a radar system comprising a FMCW radar transceiver, a retrofit transmit/receive module connected to the FMCW radar transceiver, and an antenna connected to the retrofit transmit/receive module, wherein: the FMCW radar transceiver comprises a transmitter, a receiver connected to the transmitter, analog-to-digital converters connected to the receiver, a digital signal processor connected to the analog-to-digital converters, and a microcontroller connected to the digital signal processor and to the transmitter; the antenna comprises an array of antenna elements; and the retrofit transmit/receive module comprises a plurality of SPDT switches and a plurality of BFICs, each BFIC being connected to a corresponding SPDT switch and to a corresponding set of antenna elements of the antenna, and one port of each SPDT switch being connected to the transmitter and another port of each SPDT switch being connected to the receiver.

Other aspects of electronically steerable monopulse radar systems with both pulsed and FMCW modes are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of an electronically steerable monopulse radar system with both pulsed and FMCW modes are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Radar signals typically fall into two categories: pulsed signals and continuous signals. Pulsed signals are on for a short period of time and then turn off and wait for a returned echo. In contrast, FMCW radar typically uses a frequency-modulated continuous signal that bounces off the targets continuously and returns to the receiver. In particular, a linear frequency-modulated sweep signal (the frequency of which increases or decreases with time) is usually applied and the returned signal can be mixed with the transmitted signal to produce a single expected tone for each target return. This linear frequency-modulated sweep signal is also called a linear chirp or linear frequency-modulated signal. There are a number of advantages to using FMCW radar in comparison to pulsed radar.

Figure 1:
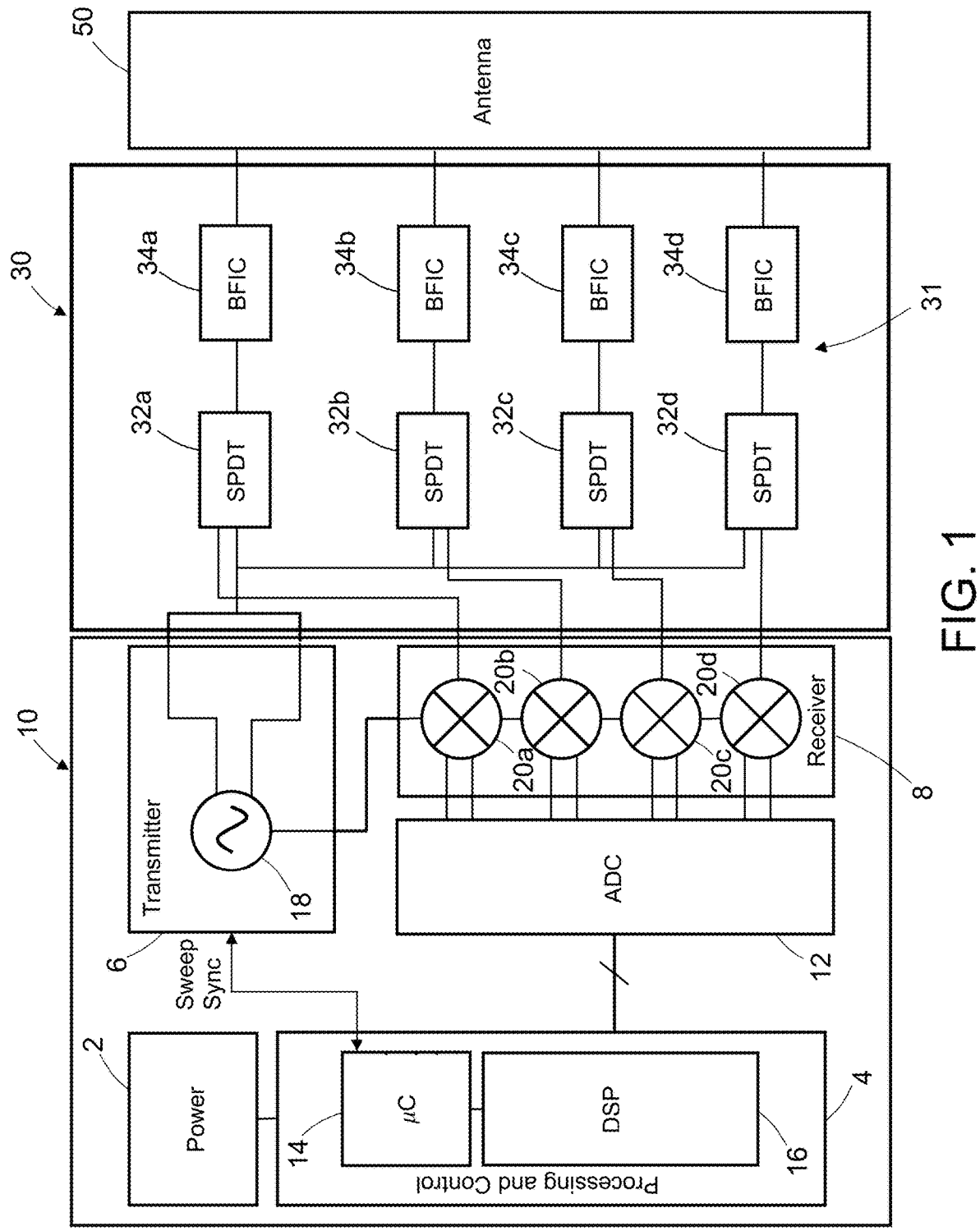
FIG. 1 is a block diagram identifying components of a COTS FMCW radar transceiver with retrofit components added to enable both pulsed and FMCW mode operation using electronic beam steering.

FIG. 1 is a block diagram identifying components of a COTS FMCW radar transceiver with retrofit components added to enable both pulsed and FMCW mode operation using electronic beam steering. More specifically, FIG. 1 identifies some components of a FMCW radar transceiver 10 that has been disconnected from an antenna 50 and then connected to a retrofit transmit/receive module 30 to enable dual pulsed mode and FMCW mode operation using electronic beam steering. The antenna 50 is connected to the retrofit transmit/receive module 30 before or after retrofit transmit/receive module 30 is connected to FMCW radar transceiver 10. As seen in FIG. 1, the retrofit transmit/receive module 30 is installed between FMCW radar transceiver 10 and antenna 50.

In accordance with some embodiments, the antenna 50 is mounted to a two-axis positioning system (e.g., a two-axis gimbal) used to orient the antenna 50. In alternative embodiments, the antenna 50 may be a phased array antenna that includes an array of antenna elements and a corresponding array of phase shifters. In a phased array antenna, the feed current for each antenna element passes through a respective phase shifter controlled by a beam steering controller. The beam steering controller is computer configured (e.g., programmed) to control the phase shifters in a manner such that the antenna elements emit respective RF waves that combine to produce a transmit beam having elevation and azimuth angles.

In the embodiment depicted in FIG. 1, the retrofit transmit/receive module 30 includes a plurality of transmit/receive channels 31. Each transmit/receive channel 31 includes a single-pole double-throw switch (hereinafter "SPDT switch") and a beamformer integrated circuit (hereinafter "BFIC") connected in series. In the example implementation depicted in FIG. 1, four transmit/receive channels 31 are shown. The first transmit/receive channel includes SPDT switch 32a and BFIC 34a connected in series; the second transmit/receive channel includes SPDT switch 32b and BFIC 34b connected in series; the third transmit/receive channel includes SPDT switch 32c and BFIC 34c connected in series; and the fourth transmit/receive channel includes SPDT switch 32d and BFIC 34d connected in series. The plurality of BFICs 34a-34d are connected to the antenna 50.

The FMCW radar transceiver 10 includes a transmitter 6 that is connected to SPDT switches 32a-32d and a receiver 8 that is connected to SPDT switches 32a-32d. The receiver 8 has a plurality of mixers 20a-20d connected to respective input ports, which input ports are respectively connected to SPDT switches 32a-32d. The FMCW radar transceiver 10 further includes a plurality of analog-to-digital converters 12 (hereinafter "ADCs 12") having inputs respectively connected to outputs of receiver 8. The transmitter 6 of FMCW radar transceiver 10 includes a local oscillator (LO) 18. The local oscillator 18 is configured to output linear frequency-modulated signals to transmit/receive channels 31 of the retrofit transmit/receive module 30 and to mixers 20 inside receiver 8 of FMCW radar transceiver 10.

The FMCW radar transceiver 10 further includes a power supply 2 and a processing and control board 4 that receives power from power supply 2. The local oscillator 18 also receives power from power supply 2. The processing and control board 4 includes a microcontroller 14 and a digital signal processor 16 (hereinafter "DSP 16"). The microcontroller 14 is connected and configured to control the sweeping of the local oscillator 18 in accordance with parameters of a selected mode of operation. The microcontroller 14 is also connected and configured to control the states of SPDT switches 32a-32d of the retrofit transmit/receive module 30 in accordance with timing parameters of the selected mode. The DSP 16 is connected to receive digital radar signals from the ADCs 12. The DSP 16 is configured to detect and estimate the range of potential targets in the scene. Any detected targets are reported to the microcontroller 14, along with the estimated target range if known. The microcontroller 14 is configured to start in a search mode and then transition to either a tracking mode or an FMCW mode in dependence on the estimated target range acquired in the search mode.

Still referring to FIG. 1, in the transmit mode, transmit/receive channels 31 operate under the control of microcontroller 14 to convert oscillator signals generated by local oscillator 18 into suitably conditioned signals for driving the antenna elements. In addition, in the receive mode, each transmit/receive channel 31 operates under the control of microcontroller 14 to condition received signals to protect against large signal voltage swings and to set the signal level correctly for the rest of the signal channel (and ultimately to set the signal level within the ADC's voltage range).

The input ports of receiver 8 of FMCW radar transceiver 10 are respectively connected to SPDT switches 32a-32d. In the embodiment depicted in FIG. 1, the switching states of SPDT switches 32a-32d are controlled by microcontroller 14 and synchronized to the pulse sequence of the FMCW radar transceiver 10. In alternative embodiments, the microcontroller 14 controlling the switching states of SPDT switches 32a-32d may be disposed external to FMCW radar transceiver 10. This synchronization can be achieved by: (1) utilizing a trigger signal provided by the FMCW radar transceiver 10 to the microcontroller 14; (2) utilizing a trigger signal provided by the microcontroller 14 to the FMCW radar transceiver 10; or (3) detecting the signal transmitted by the FMCW radar transceiver 10 and supplying that as a trigger signal to the microcontroller 14. Some FMCW radar transceivers have embedded microcontrollers and digital signal processing units, whereas others do not. In the case of the former, the embedded processing capability of the radar can be leveraged where applicable to perform radar management and signal processing functions and in the case of the latter, an external microprocessor and an external digital signal processing unit may be provided.

Figure 2:
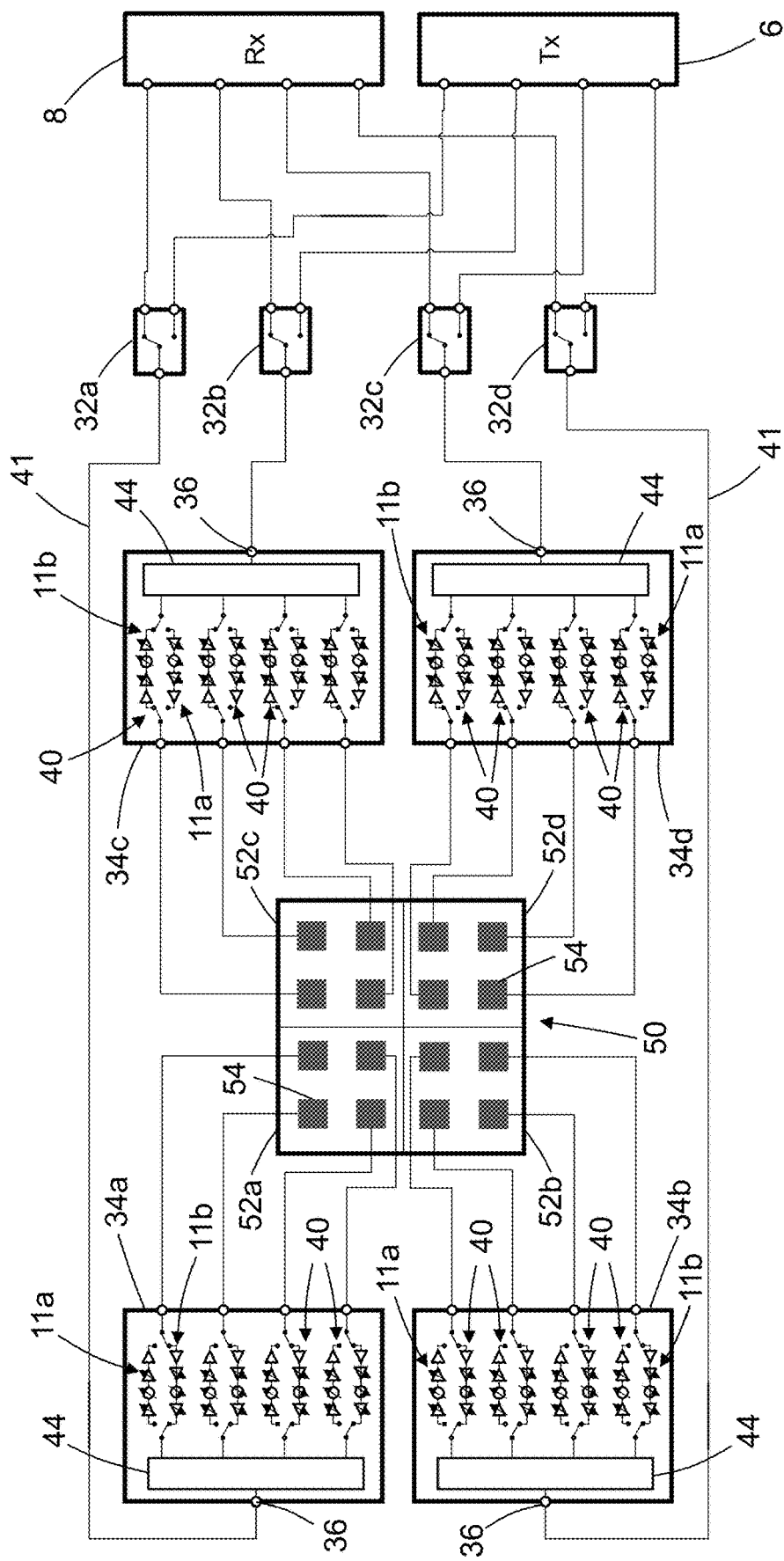
FIG. 2 is a circuit diagram depicting components of an electronically steerable phased array antenna and switching network connected to an FMCW radar transceiver to enable a low-cost monopulse tracking system in accordance with one proposed implementation. The switches are depicted in respective states which are appropriate for operation in a pulsed mode.

FIG. 2 is a circuit diagram depicting components of an electronically steerable phased array antenna and switching network connected to transmitter 6 and receiver 8 of an FMCW radar transceiver to enable a low-cost monopulse tracking system in accordance with one proposed implementation. The SPDT switches 32a-32d are depicted in respective states which are appropriate for operation in a pulsed mode.

The antenna 50 depicted in FIG. 2 includes a multi-element antenna array, such as but not limited to a microstrip patch array. Each antenna element 54 may consist of a subarray (i.e., a small group) of elements, as is well known to those skilled in the art. A 4×4 array is shown for simplicity. In a preferred embodiment, the array is 16×16. The antenna array can be evenly divided into four non-overlapping quadrants 52a-52d, as shown in FIG. 2. Each quadrant in the array is paired with a respective BFIC. Each element 54 in a quadrant is directly connected to one output port of the associated BFIC. In the example depicted in FIG. 2, the elements 54 of quadrant 52a are connected to BFIC 34a; the elements 54 of quadrant 52b are connected to BFIC 34b; the elements 54 of quadrant 52c are connected to BFIC 34c; and the elements 54 of quadrant 52d are connected to BFIC 34d.

As shown in FIG. 2, each of the plurality of BFICs 34a-34d comprises a respective plurality of (e.g., four) BFIC modules 40. Each BFIC module 40 includes a transmit circuit 11a and a receive circuit 11b. However, there are many different constructions of BFICs and the technology proposed herein should be applicable to a vast majority of them. Each BFIC module 40 is connected to a respective single channel 41 via a respective combining network 44, although multiple-input, multiple-output BFIC architectures should also be considered within the scope of this disclosure.

Figure 2A:
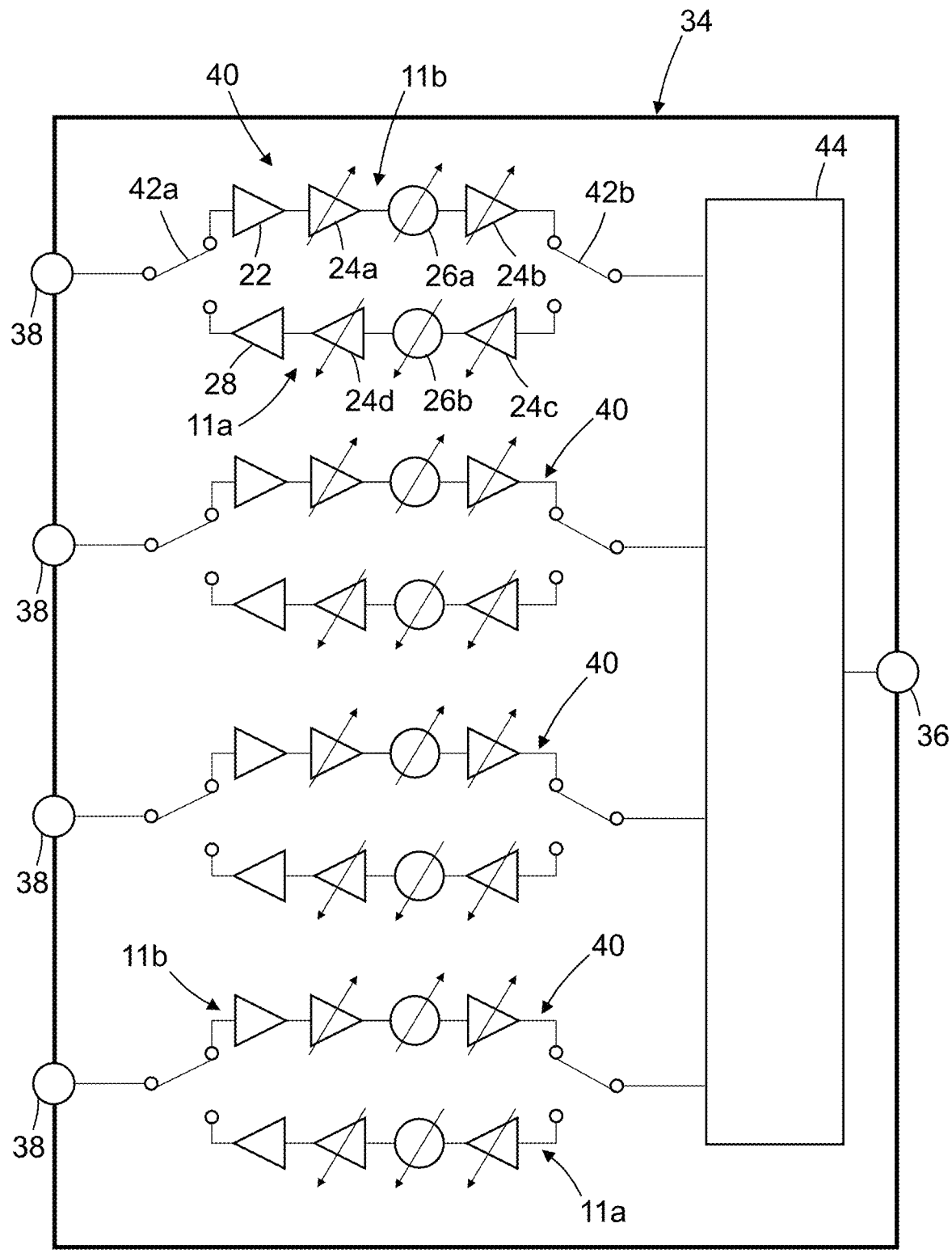
FIG. 2A is a circuit diagram depicting components of a beamforming integrated circuit (BFIC) which may be employed in the proposed implementation represented in FIG. 2.

FIG. 2A is a circuit diagram depicting components of a BFIC 34 which may be employed in the proposed implementation represented in FIG. 2. BFIC 34 includes a plurality of four BFIC modules 40. Each BFIC module 40 includes a transmit circuit 11a and a receive circuit 11b (hereinafter "transmit/receive circuits 11a/11b") connected in parallel between two SPDT switches 42a and 42b. The transmit/receive circuits 11a/11b are connected to one port 36 of the BFIC 34 by way of a combining network 44 (which is also part of BFIC 40). More specifically, each SPDT switch 42b is connected to port 36 by way of combining network 44, while each SPDT switch 42a is connected to a respective port 38.

Figure 3:
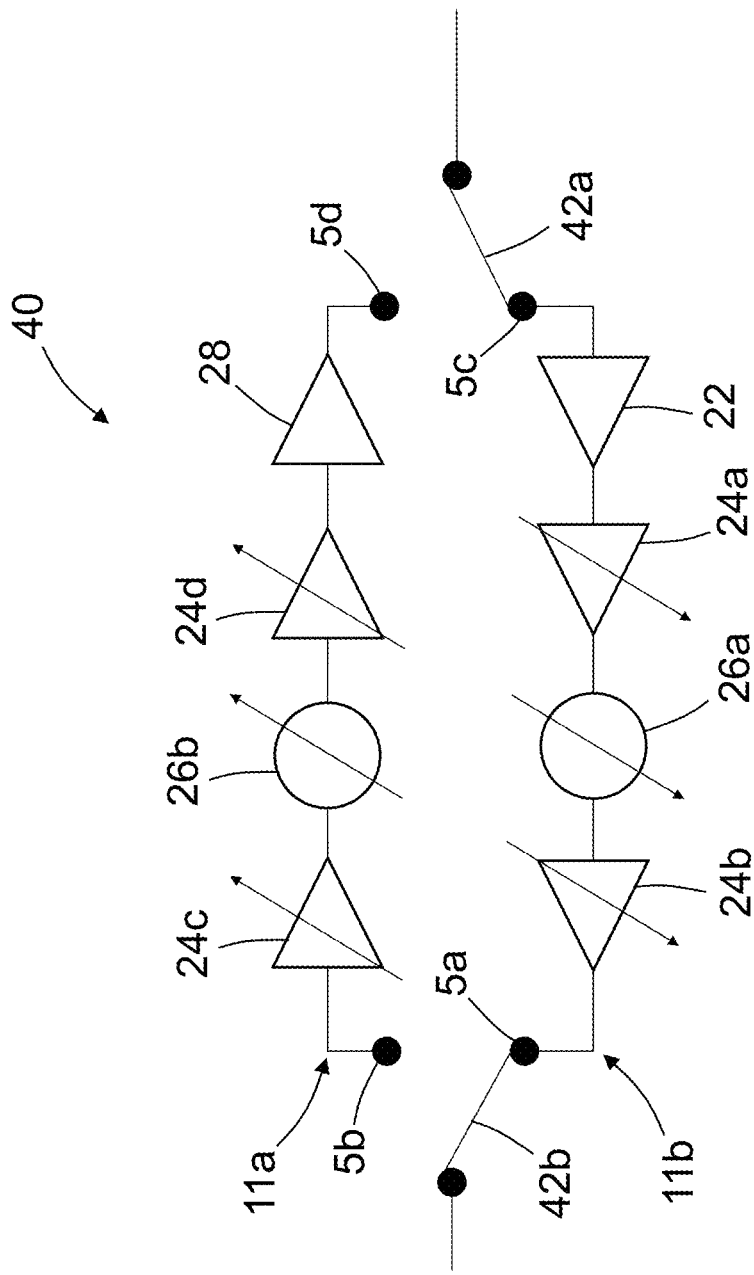
FIG. 3 is a circuit diagram depicting components of one BFIC module of a type used in multiple instances in the BFIC represented in FIG. 2A.

FIG. 3 is a circuit diagram depicting components of one BFIC module 40 of the type used in multiple instances in the BFICs 34a-d represented in FIG. 2. In accordance with the example implementation depicted in FIG. 3, the receive circuit 11b includes the following circuit elements connected in series: a low-noise amplifier 22, a variable gain amplifier 24a, a variable phase shifter 26a, and a variable gain amplifier 24b. The input of low-noise amplifier 22 is connected to SPDT switch 42a; the output of variable gain amplifier 24b is connected to SPDT switch 42b. In accordance with the example implementation depicted in FIG. 3, the transmit circuit 11a includes the following circuit elements connected in series: a variable gain amplifier 24c, a variable phase shifter 26b, a variable gain amplifier 24d, and a power amplifier 28. The output of power amplifier 22 is connected to SPDT switch 42a; the input of variable gain amplifier 24c is connected to SPDT switch 42b. More specifically, transmit circuit 11a connects contact 5b of SPDT switch 42b to contact 5d of SPDT switch 42a, while receive circuit 11b connects contact 5a of SPDT switch 42b to contact 5c of SPDT switch 42a.

FIG. 3 shows the states of SPDT switches 42a and 42b when the BFIC module 40 is operating in a receive mode. By adjusting the variable gain amplifiers in the system, the output power and sensitivity of the system can be adjusted for short- or long-range operation. By adjusting the variable phase shifters at each port, using well-known beamforming methods, the radiation pattern of the antenna can be electronically steered.

Referring again to FIG. 2, the port 36 of each of the plurality of BFICs 34a-34d is connected to the associated SPDT switches 32a-32d respectively. The two switched ports of the SPDT switches 32a-32d are separately connected to one receive channel of receiver 8 and one transmit channel of transmitter 6 of an FMCW radar transceiver. There are many different architectures of FMCW radars and in one embodiment, the FMCW radar transceiver has an equal number of transmit and receive ports, which are also equal to the number of BFICs. In the event that an FMCW radar transceiver has a number of transmit and/or receive ports less than the number of BFICs desired by the phased array architecture, there are several methods, well known in the literature, for synchronizing additional radar transmitters, receivers, and/or transceivers or specifically in the case of the transmitter, splitting the transmit channel to increase the channel count.

Figure 4:
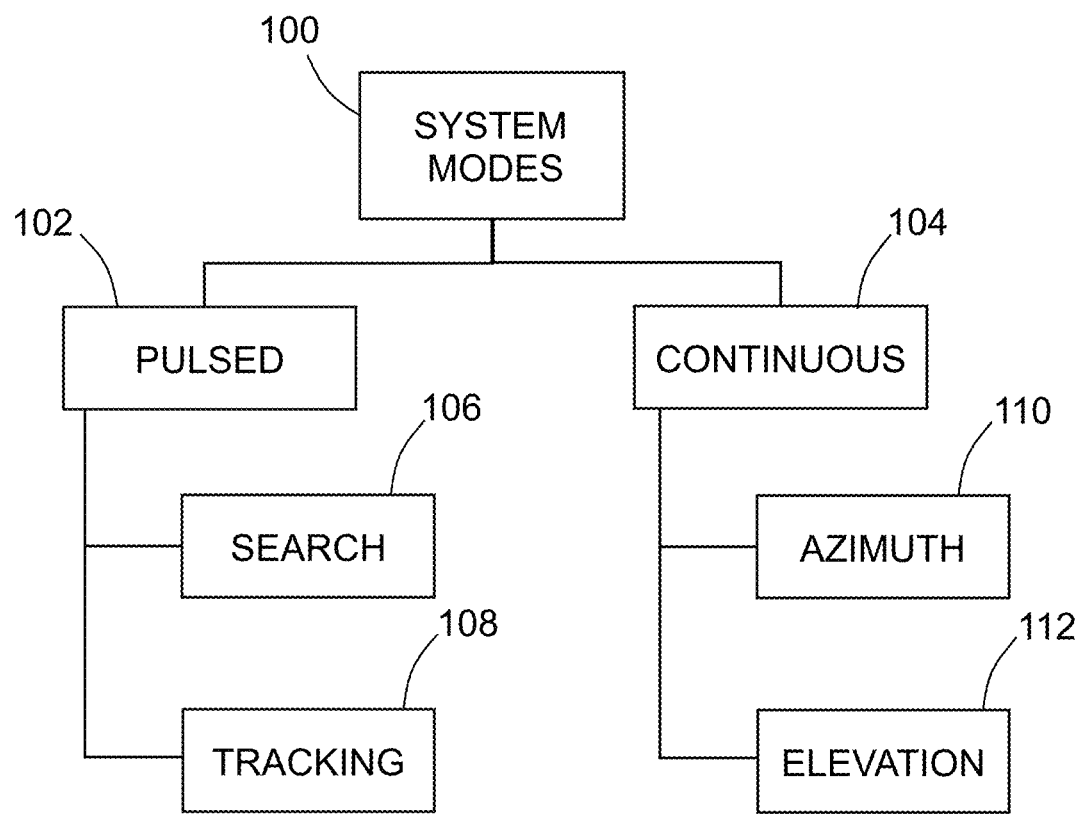
FIG. 4 is a flowchart showing a hierarchy of different modes of operation for an electronically steerable monopulse radar system in accordance with one embodiment.

Due to the number of degrees of freedom afforded to the system by the various switches and radar sweep configurations, there are various modes in which the system can operate, affording a high degree of configurability. FIG. 4 is a flowchart showing a hierarchy of different system modes 100 of operation for an electronically steerable monopulse radar system in accordance with one embodiment. In regard to the operation of the antenna, there are two primary modes: a pulsed mode 102 and a continuous mode 104, each of which has two sub-modes (as shown in FIG. 4). In the pulsed mode 102, all switches, including those internal to the BFICs 34a-34d and the SPDT switches 32a-32d, are switched synchronously. This mode of operation allows the entire antenna array to be used for either transmit or receive, thus maximizing antenna gain and output power. There are two distinct pulsed modes in which a FMCW radar transceiver can be configured to operate in.

In the first pulsed sub-mode (hereinafter "search mode 106"), the radar sweep is set to a low bandwidth, creating large-range bins but also enabling a large maximum range. In this configuration, the transmit channels are pulsed for each sweep using the aforementioned switches. This enables the power amplifiers in the BFICs to be operated at high power, significantly increasing range without overloading the sensitive receive channels. The duration that the transmit switches are on is determined by the minimum desired measurement range. Once the transmit switches are closed, preventing energy from being radiated by the radar, the SPDT switches internal and external to the BFICs are simultaneously switched to receive for the remainder of the sweep duration. The advantage of this mode is that long ranges and large range windows can be achieved; however, the resulting range resolution is poor.

To alleviate the range resolution issue and enable high-resolution target identification and recognition, a second pulsed sub-mode (hereinafter "tracking mode 108") is engaged once an initial range estimate is obtained from the search mode 106. The tracking mode 108 utilizes a technique known as stretch processing, wherein a first local oscillator (LO) chirp is generated by the radar and used to radiate a signal into free space. The reflected returns from the first LO chirp are mixed with a second LO chirp centered in time at the estimated round trip time from the radar to the target and back. In accordance with one embodiment, this is implemented by having two distinct and concurrent switch and sweep sequences. In the first sequence, all switches are configured to transmit, allowing signals to be radiated but not received by the system, once again preventing high-power signals from damaging sensitive receivers. In the second sequence, all switches are configured to receive, thereby preventing additional signals from being radiated from the radar while allowing the signals transmitted in the first sequence to be received by the system. The duration of these two sequences are determined by the desired range resolution and range extent as well as the estimated range to the target. The advantage of the tracking mode 108 is that since the range extent is limited to a small window around the target, much smaller range resolutions can be achieved, thereby improving target identification and tracking.

At short range, it is desired to concurrently transmit and receive in a continuous mode 104. In accordance with the methodology proposed herein, concurrent transmission and reception is achieved by dedicating some quadrants in the array to continuous transmission and other quadrants to continuous reception. This effect is achieved by toggling all switches connected to corresponding quadrants to transmit or receive configurations. In accordance with one proposed implementation, two distinct sub-modes of continuous operation—namely, an azimuth mode 110 and an elevation mode 112—are defined for monopulse radar operation, which provides high-accuracy estimates of a target's angular location.

Figure 5:
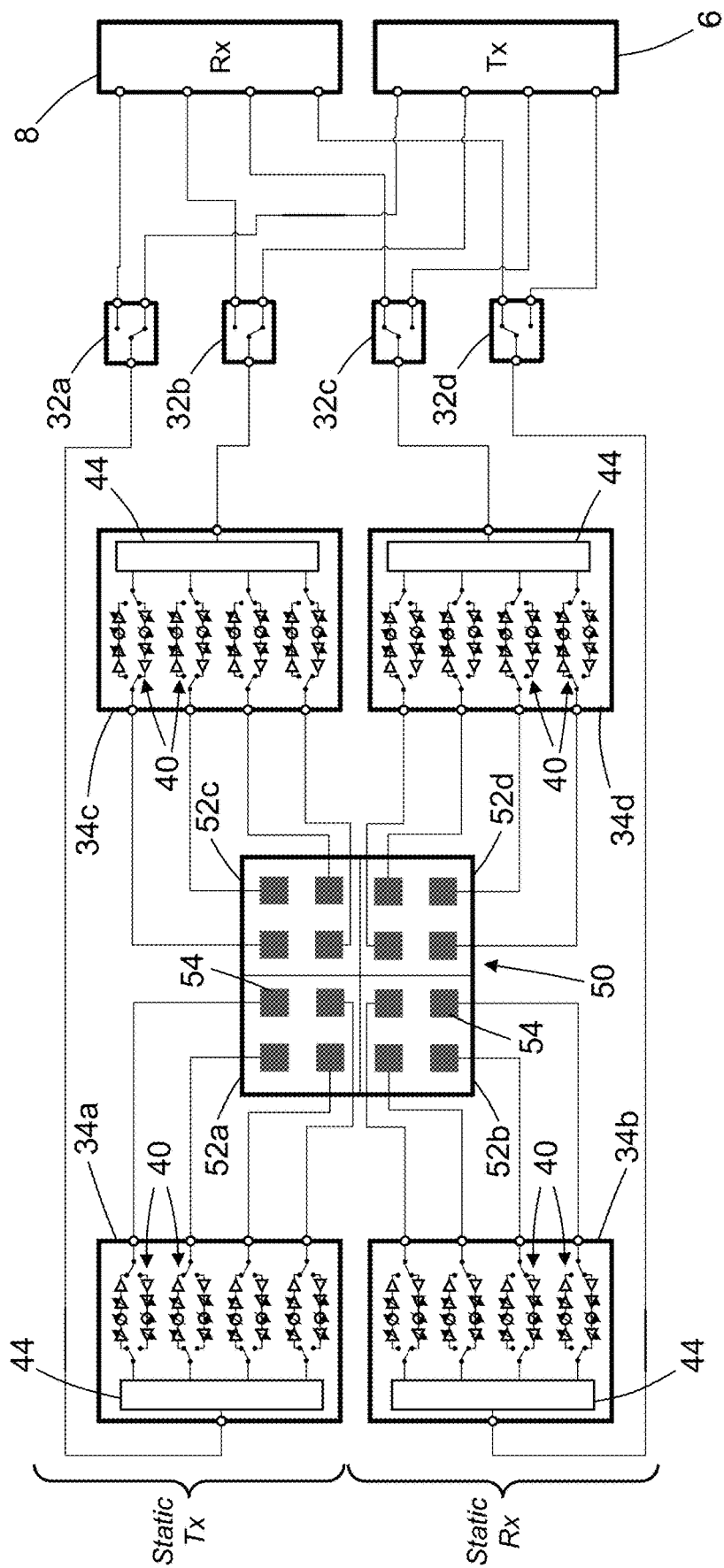
FIG. 5 is a circuit diagram depicting the same components depicted in FIG. 2, except that the switches are in states which are appropriate for operation in a continuous wave azimuth mode.

In the case in which estimates of a target's bearing in azimuth is desired, the two top quadrants of the array are dedicated to transmission and the bottom two quadrants are dedicated to reception as shown in FIG. 5. The choice of dedicating the top of the array to transmit and the bottom of the array to receive is arbitrary and the inverse configuration (i.e., the top two quadrants used in reception and the bottom two quadrants used in transmission) should be viewed as equivalent to the configuration shown in FIG. 5. In this configuration, conventional monopulse radar processing is utilized with the two receive quadrants, thereby enabling high-accuracy bearing estimation in azimuth. FIG. 5 shows the SPDT switches 32a-32b in states which are appropriate for operation in a continuous wave azimuth mode.

Figure 6:
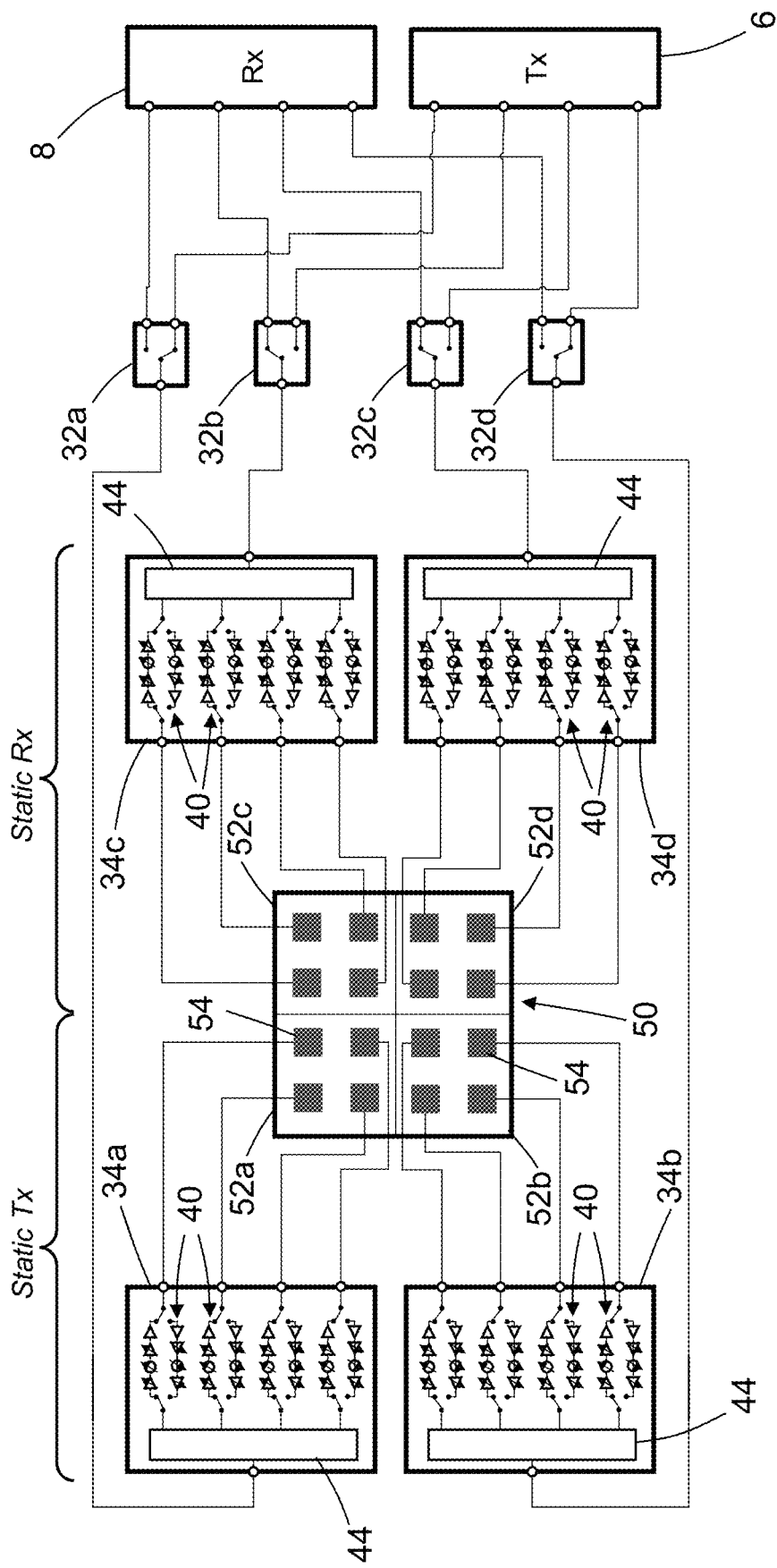
FIG. 6 is a circuit diagram depicting the same components depicted in FIGS. 2 and 5, except that the switches are in states which are appropriate for operation in a continuous wave elevation mode.

In the case in which estimates of a target's bearing in elevation is desired, the two left quadrants of the array are dedicated to transmission and the two right quadrants are dedicated to reception as shown in FIG. 6. The choice of dedicating the left side of the array to transmit and the right side of the array to receive is arbitrary and the inverse configuration (i.e., the left two quadrants used in reception and the right two quadrants used in transmission) should be viewed as equivalent to the configuration shown in FIG. 6. In this configuration, conventional monopulse radar processing is utilized with the two receive quadrants, thereby enabling high-accuracy bearing estimation in elevation. FIG. 6 shows the SPDT switches 32a-32b in states which are appropriate for operation in a continuous wave elevation mode.

Figure 7:
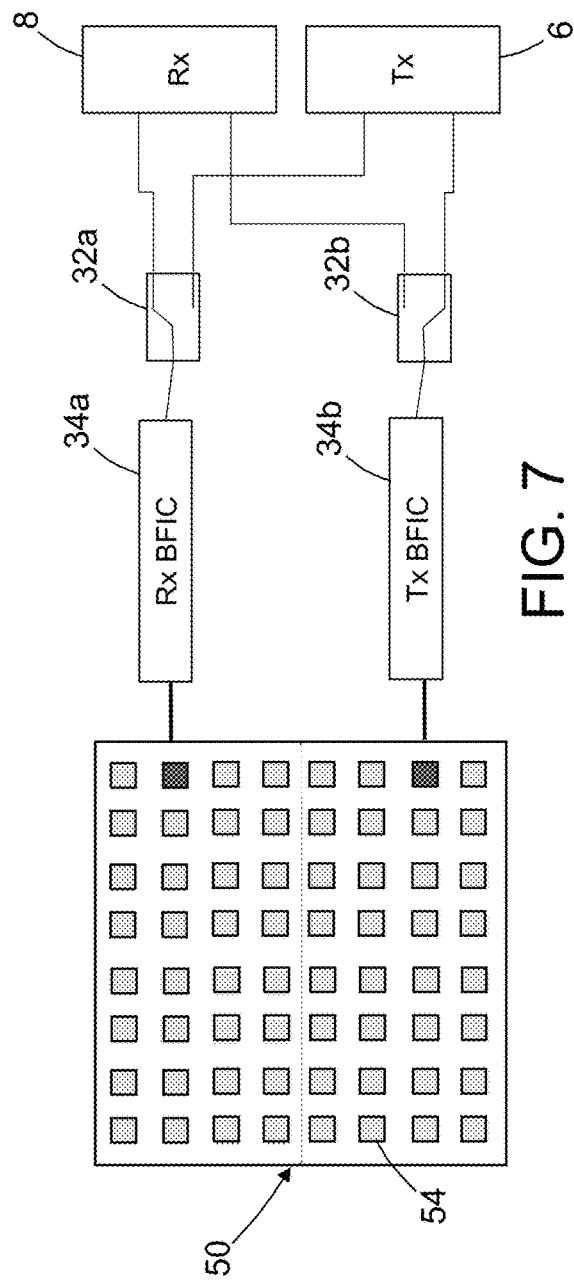
FIG. 7 is a diagram representing an array of antenna elements which has been reconfigured for use in a split aperture mode at short range to enable simultaneous transmit and receive.

FIG. 7 is a diagram representing an antenna 50 comprising an array of antenna elements 54 which has been reconfigured for use in a split aperture mode at short range to enable concurrent transmission and reception. The external SPDT switches are configured to continuously connect one half of the BFICs to the transmit channels and the other half of the BFICs to the receive channels. In the example configuration depicted in FIG. 7, SPDT switch 32a connects BFIC 34a to a receive channel of the receiver 8, while SPDT switch 32b connects BFIC 34b to a transmit channel of the transmitter 6.

Figure 8:
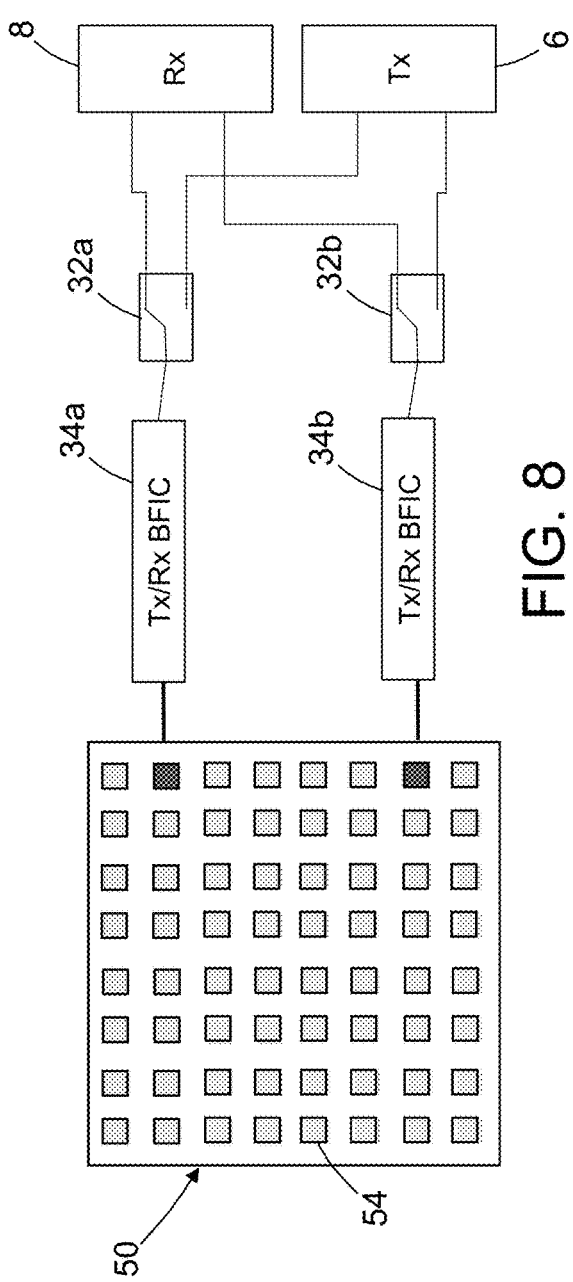
FIG. 8 is a diagram representing an array of antenna elements which has been reconfigured for use in a pulsed aperture mode at long range to enable the entire aperture to be used for both transmit and receive.

FIG. 8 is a diagram representing an antenna 50 comprising an array of antenna elements 54 which has been reconfigured for use in a pulsed aperture mode at long range to enable the entire aperture to be used for both transmission and reception. The external SPDT switches are synchronously switched with the internal SPDT switches in the BFICs between transmit and receive channels. In the example configuration depicted in FIG. 8, SPDT switch 32a connects BFIC 34a to one receive channel of the receiver 8, while SPDT switch 32b connects BFIC 34b to another receive channel of the receiver 8.

Figure 9:
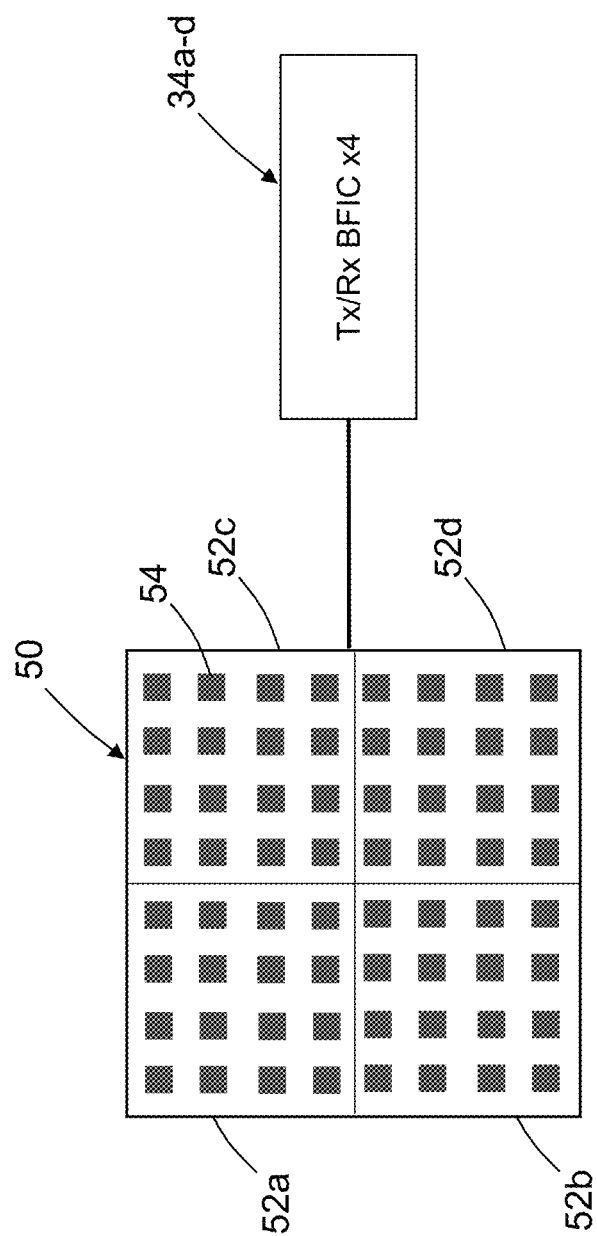
FIG. 9 is a diagram representing an array of antenna elements which has been reconfigured for use in a pulsed aperture mode.
Figure 10:
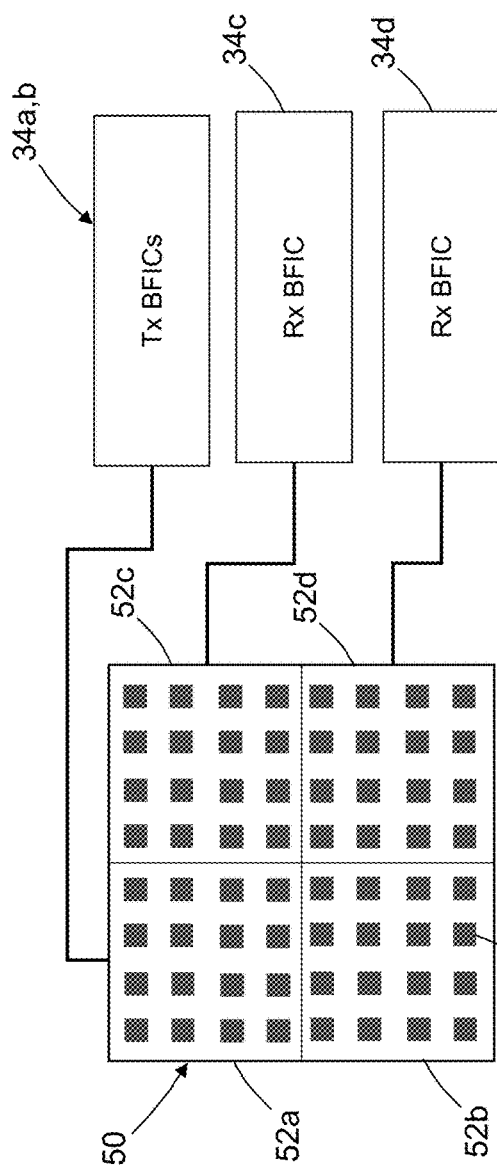
FIG. 10 is a diagram representing an array of antenna elements which has been reconfigured for use in an elevation monopulse aperture mode.
Figure 11:
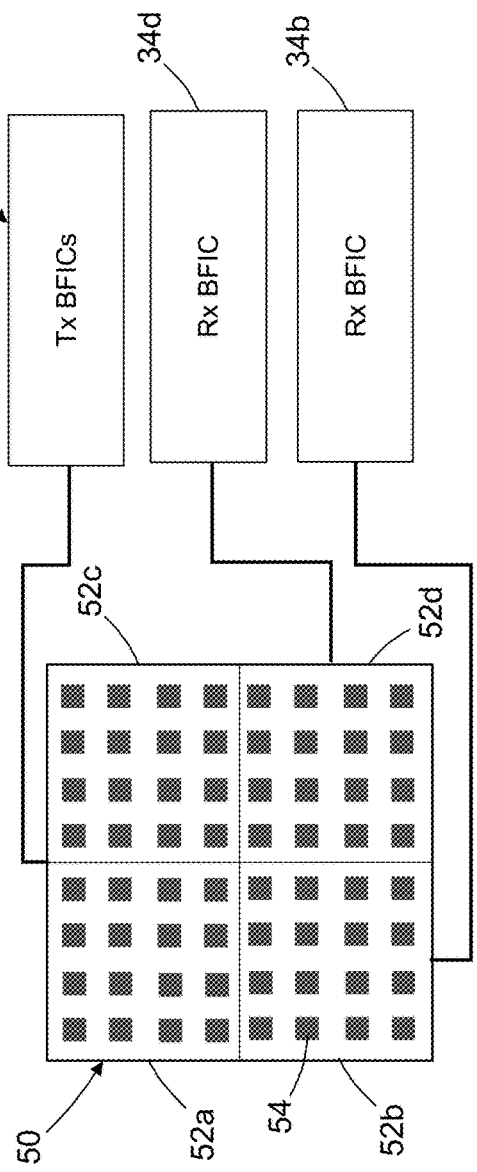
FIG. 11 is a diagram representing an array of antenna elements which has been reconfigured for use in an azimuth monopulse aperture mode.

The available aperture modes are summarized in FIGS. 9-11. In the pulsed mode, all four quadrants transmit or receive in unison. In the continuous wave mode, the aperture can be divided vertically or horizontally to allow for azimuth or elevation estimation.

FIG. 9 is a diagram representing an antenna 50 comprising an array of antenna elements 54 which has been reconfigured for use in a pulsed aperture mode. The four quadrants 52a-52d are all connected to either the receiver or the transmitter (not shown in FIG. 9) via the BFICs 34a-34d respectively.

FIG. 10 is a diagram representing an antenna 50 comprising an array of antenna elements 54 which has been reconfigured for use in a continuous wave elevation aperture mode. The quadrants 52a and 52b are connected to the transmitter (not shown in FIG. 10) via the BFICs 34a and 34b respectively; the quadrants 52c and 52d are connected to the receiver (not shown in FIG. 10) via the BFICs 34c and 34d respectively.

FIG. 11 is a diagram representing an antenna 50 comprising an array of antenna elements 54 an array of antenna elements which has been reconfigured for use in a continuous wave azimuth aperture mode. The quadrants 52a and 52c are connected to the transmitter (not shown in FIG. 11) via the BFICs 34a and 34c respectively; the quadrants 52b and 52d are connected to the receiver (not shown in FIG. 11) via the BFICs 34b and 34d respectively.

Figure 12:
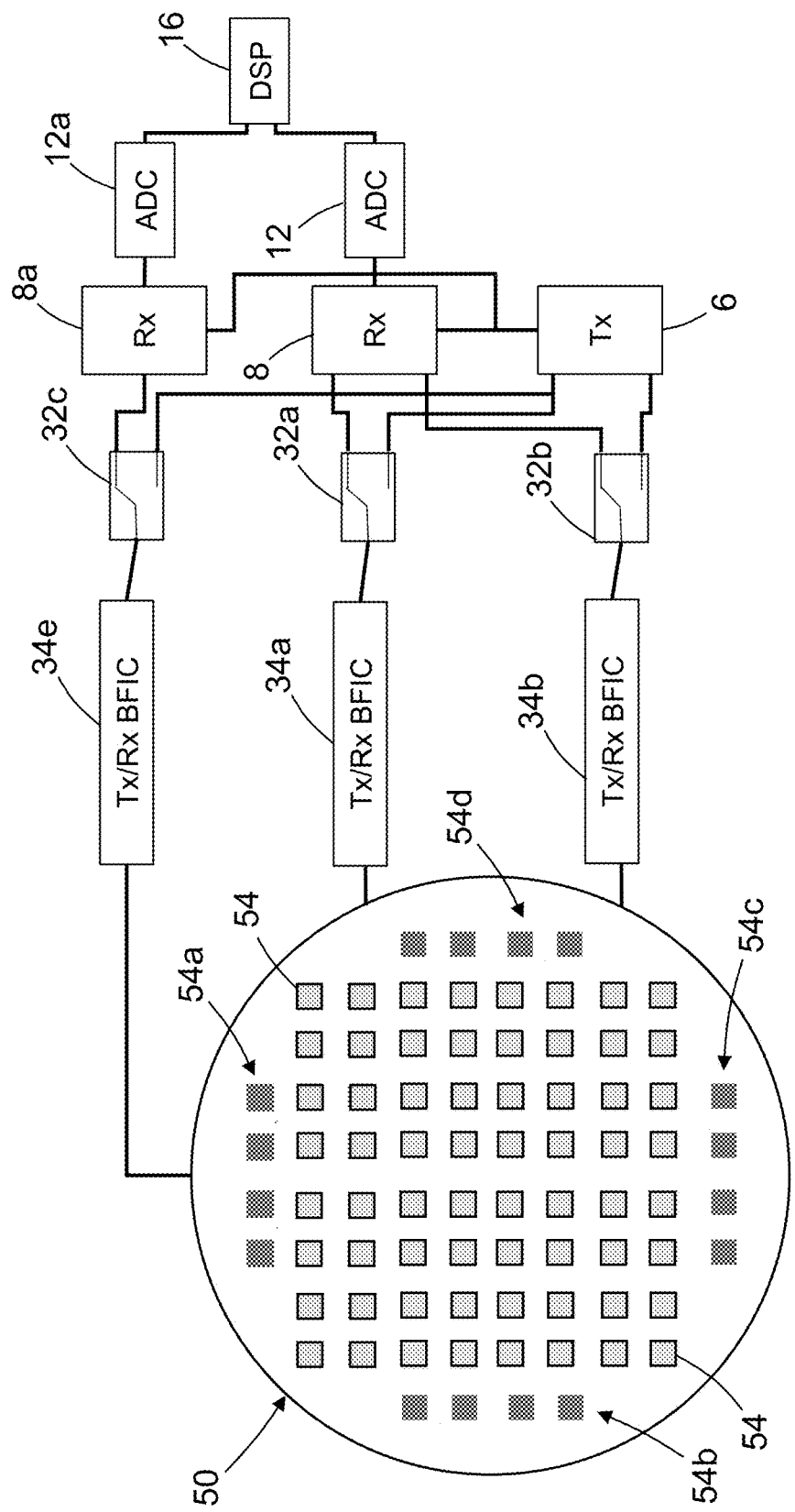
FIG. 12 is a diagram representing an extended-range version of the system which may be implemented by adding 16 array elements, a BFIC, a switch, a receiver, and an analog-to-digital converter (ADC).

FIG. 12 is a diagram representing an extended-range version of the system which may be implemented by adding sixteen array elements in array sets 54a-54d, a BFIC 34e, an SPDT switch 32c, a receiver 8a, and an analog-to-digital converter (ADC) 12a. These elements are only used in the long-range pulsed mode and deactivated during the short-range/split aperture mode. In the example depicted in FIG. 12, respective sets 54a-54d of four array elements (indicated by solid squares in FIG. 12) are arranged along the four sides of an 8×8 array of antenna elements 54 (indicated by open squares in FIG. 12). FIG. 12 depicts only two BFICs 34a and 34b connected to the 8×8 array of antenna elements 54 to avoid clutter. It should be appreciated, however, that the 8×8 array of antenna elements 54 may be organized to form quadrants, in which case there would be four BFICs 34a-34d (in addition to BFIC 34e) respectively connected to the antenna elements of the quadrants.

Figure 13:
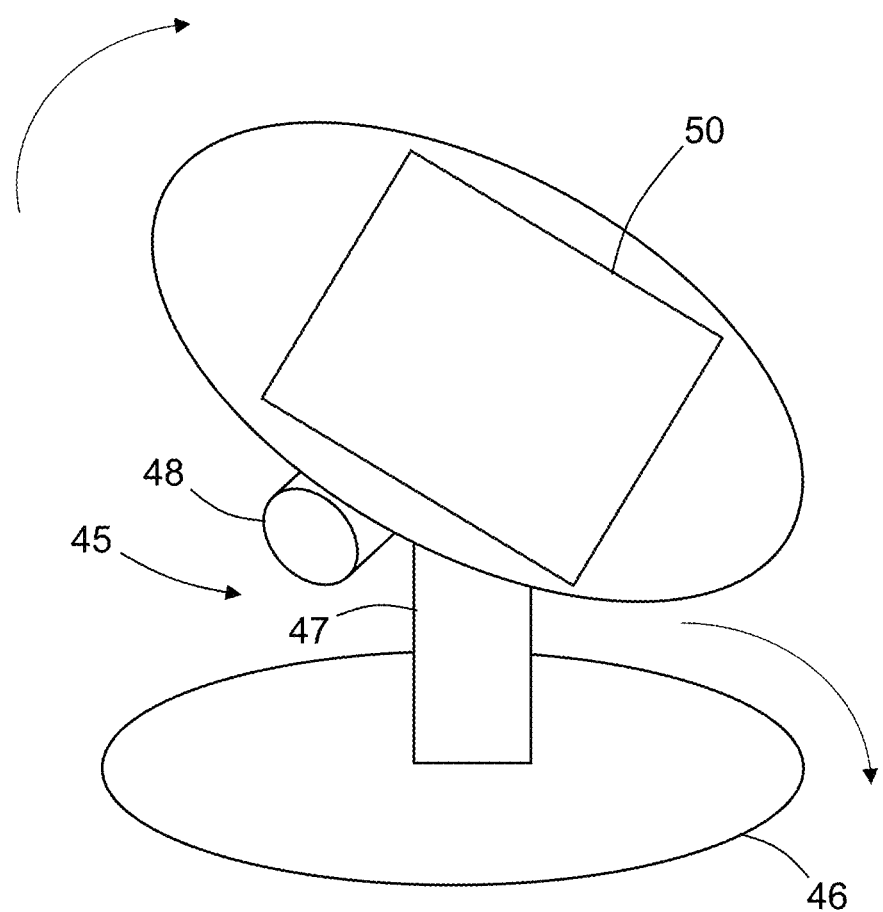
FIG. 13 is a diagram depicting an implementation in which the antenna and associated circuitry are mounted to an antenna positioning system in the form of a two-axis gimbal.

FIG. 13 is a diagram depicting an implementation in which the antenna 50 and associated circuitry are mounted to an antenna positioning system 45 in the form of a two-axis gimbal. In the example depicted in FIG. 13, the antenna positioning system 45 includes a rotating base 46, a post 47 that stands on the rotating base 46, and an axle 48 that is attached to post 47. The antenna 50 can be rotated about the axis of post 47 and about the axis of axle 48.

The descriptions of FIGS. 14, 15, 16A, 16B, 17A, 17B, 18A, and 18B which follow are taken from U.S. patent application Ser. No. 17/368,875, in which the same drawings are numbered differently.

Figure 14:
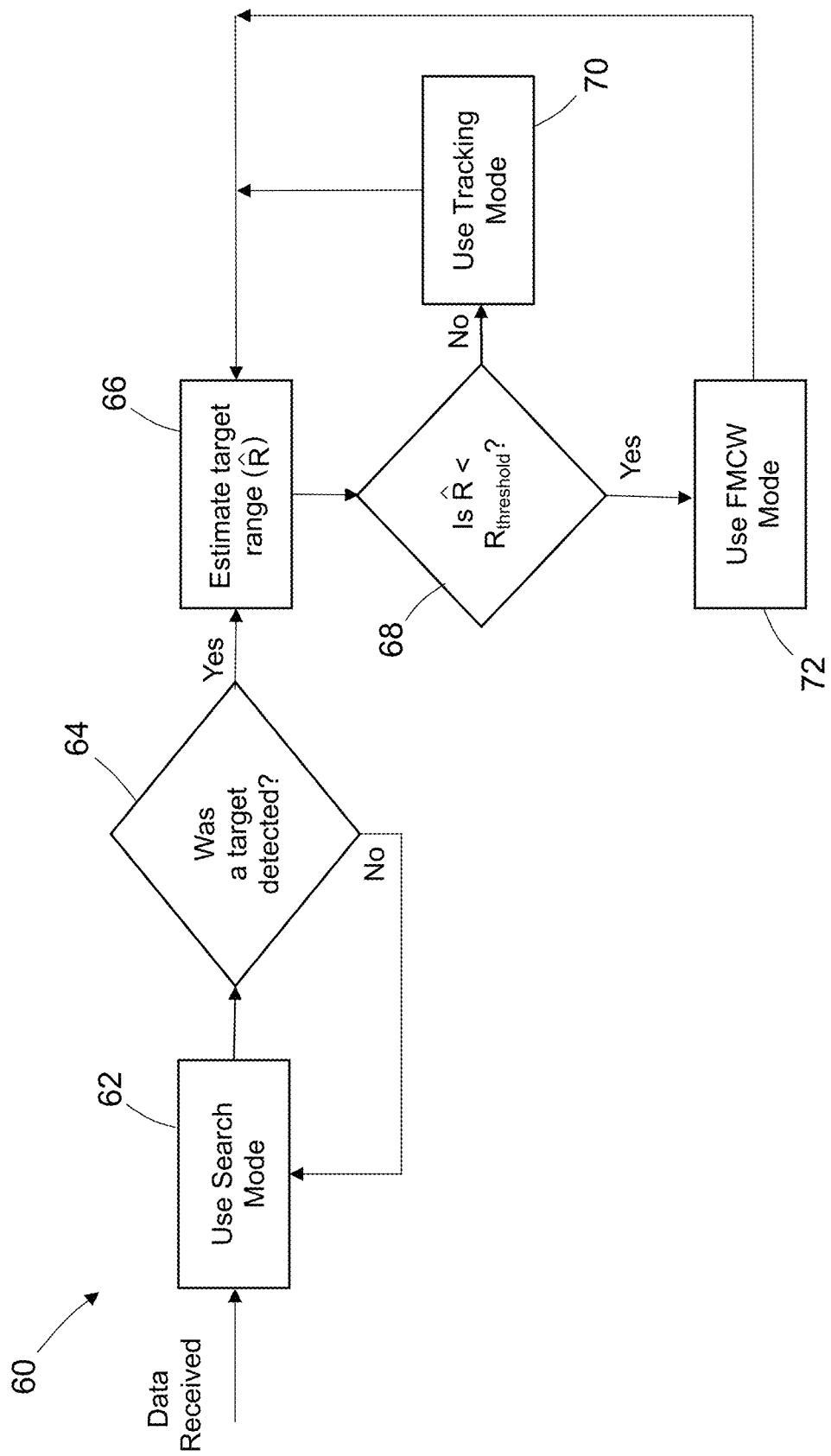
FIG. 14 is a flowchart showing the mode selection logic in accordance with one embodiment.

FIG. 14 is a flowchart showing the mode selection logic 60 governing mode selection by microcontroller 14 in accordance with one embodiment. The mode selection logic 60 is configured so that the microcontroller 14 controls the states of the transmit and receive switches in the retrofit transmit/receive module 30 in three distinct modes.

Initially the system operates in a long-range search mode (step 62) wherein the radar sweep is set to a low bandwidth, creating large range bins but also large maximum range. In this configuration, each transmit channel 26 is pulsed using a respective transmit switch 32. This enables high-power amplifiers (e.g., power amplifier 40) to be utilized, significantly increasing range without damaging the sensitive receive electronics. The duty cycle of the transmit switch 32 in the search mode is determined by the minimum desired measurement range. Once the transmit switch 32 is closed, preventing energy from being radiated by the radar, the receive switches 46 in the receive channels 28 are opened for the remainder of the sweep duration and closed at its conclusion. The DSP 16 processes the radar signals by first detecting a target and then calculating an estimated target range $\hat{R}$ to the detected target. The DSP 16 reports each target detection to the microcontroller 14, including digital data representing the estimated target range $\hat{R}$.

The advantage of the search mode is that long ranges can be achieved; however, the resulting range resolution is poor. To alleviate this issue and enable high-resolution target identification and recognition, a second mode is engaged once an initial range estimate is obtained from the search mode.

Referring again to FIG. 14, the microcontroller 14 is configured to continually determine whether a target has been detected or not (step 64). On the one hand, if the microcontroller 14 determines in step 64 that a target was not detected, the microcontroller 14 continues to operate the retrofit transmit/receive module 30 in the search mode (step 62). On the other hand, if the microcontroller 14 determines in step 64 that a target was detected, then the DSP 16 reports the most recently updated estimated target range $\hat{R}$ to microcontroller 14 (step 66) The microcontroller then makes a determination whether the estimated target range $\hat{R}$ is less than a range threshold $R_{threshold}$ or not (step 68).

On the one hand, if a determination is made in step 68 that the estimated target range $\hat{R}$ is not less than the range threshold $R_{threshold}$, then the microcontroller 14 operates the retrofit transmit/receive module 30 in the tracking mode (step 70). While operating the retrofit transmit/receive module 30 in the tracking mode, microcontroller 14 continually receives the most recently updated estimated target range from DSP 16 (step 66) and re-determines in step 68 whether the estimated target range is less than the range threshold. As long as the estimated target range is not less than the range threshold, the microcontroller 14 stays in the tracking mode.

On the other hand, if a determination is made in step 68 that the estimated target range is less than the range threshold, then the micro-controller 14 operates the retrofit transmit/receive module 30 in the FMCW mode (step 72). While operating the retrofit transmit/receive module 30 in the FMCW mode, microcontroller 14 again continually receives the most recently updated estimated target range from DSP 16 (step 66) and re-determines in step 68 whether the estimated target range is less than the range threshold. As long as the estimated target range is less than the range threshold, the microcontroller 14 stays in the FMCW mode.

The tracking mode utilizes a technique known as stretch processing, where a first LO chirp is generated by the radar and used to radiate a signal into free space. The reflected returns from this first LO chirp are mixed with a second LO chirp centered in time at the estimated round trip time from the radar to the target and back. In the system proposed herein, this is implemented by having two distinct and concurrent switch sequences. In the first sequence, the transmit switches 32 are closed but the receive switches 46 are opened, allowing signals to be radiated but not received by the system, thereby preventing high-power signals from damaging sensitive components in the receivers. In the second sequence, the transmit switches 32 are opened and the receive switches 46 are closed, thereby preventing additional signals from being radiated from the radar while allowing the signals transmitted in the first sequence to be received by the system. The durations of these two sequences are determined by the desired range resolution and range extent as well as the estimated range to the target. The advantage of the tracking mode is that since the range extent is limited to a small window around the target, much smaller range resolutions can be achieved, thereby improving target identification and tracking.

The final or terminal mode of operation for the system is a non-pulsed mode (hereinafter "FMCW mode") in which all switches are open and the radar operates as an FMCW system. In the FMCW mode, the gain on the amplifiers is reduced to prevent damage to sensitive front-end components. The FMCW mode is activated once the estimated range of the target is sufficiently low such that the radar can detect the target without operating the external power amplifiers 40 at full power. In accordance with one embodiment, the FMCW range estimation algorithm dechirp the received signal by mixing it with the transmitted signal. Then the beat frequency is extracted from the dechirped signal using any one of a variety of algorithms.

To summarize FIG. 14, the mode selection logic 60 is determined by the estimated range of the target to the radar. This estimate is determined by measuring the baseband radar return over multiple pulses and performing well known signal processing techniques to estimate both the range and speed of discrete scatterers within a scene. In the event that inertial and/or positional data is available to the radar, multiple pulses can be integrated to improve the signal-to-noise ratio of target returns. If more than one receive channel 28 is available, than the bearing of discrete scatterers can be determined through a variety of well-known techniques such as monopulse tracking algorithms.

Figure 15:
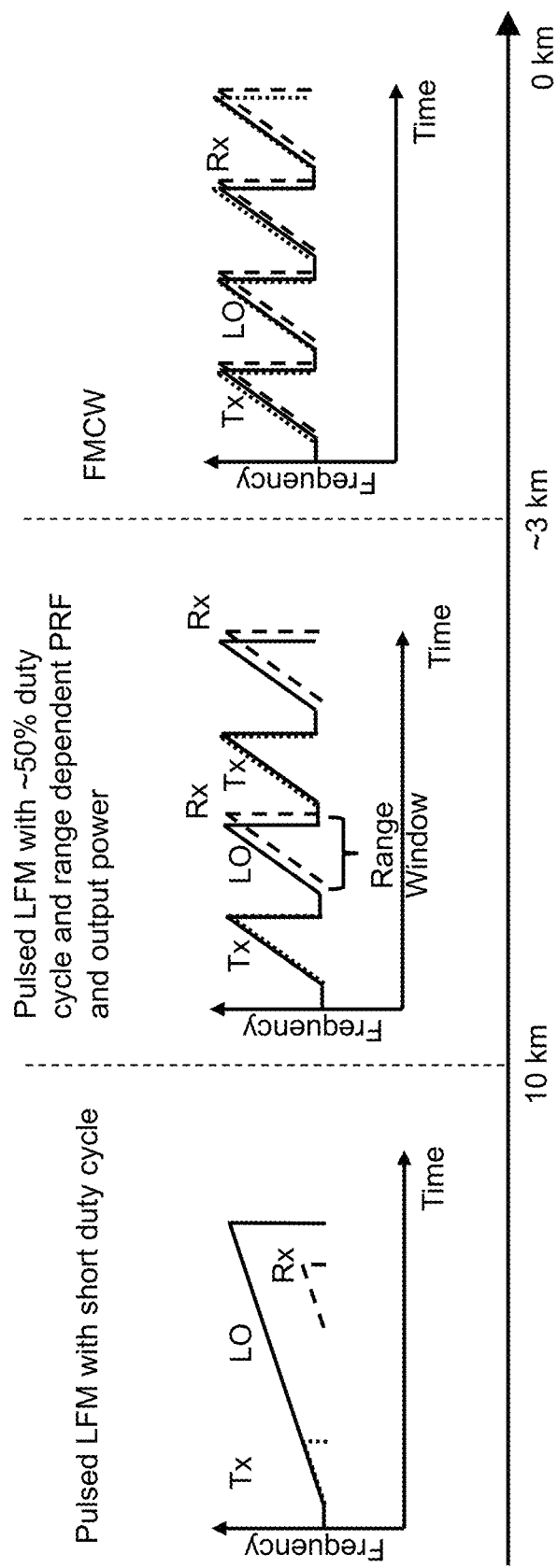
FIG. 15 is a diagram showing frequency versus time graphs for the different modes of operation of the radar system in accordance with one embodiment.

FIG. 15 is a diagram showing the different modes of operation of the radar system in accordance with one embodiment. More specifically, FIG. 15 includes respective frequency versus time graphs for the linear frequency-modulated pulses transmitted and received based on the linear frequency-modulated signals (up chirps) generated by the local oscillator 18 for the search, tracking, and FMCW modes.

The first frequency versus time graph on the left-hand side of FIG. 15 shows a linear frequency-modulated pulse with a short duty cycle used in the search mode. The solid lines represent the up chirp output by the local oscillator 18. The dotted lines represent the portion of the up chirp which is transmitted during the transmit cycle. The dashed lines represent the up chirp which is returned during the receive cycle. At the time when the search mode is initiated, the target range is not known. The search mode is able to cover all ranges greater than a few kilometers (e.g., more than 10 kilometers in the example presented in FIG. 15). The search mode has low range resolution and low angular error.

The second frequency versus time graph in the center of FIG. 15 shows linear frequency-modulated pulses with an ~50% duty cycle and range-dependent pulse repetition frequency (PRF) and output power used in the tracking mode. The solid lines represent the up chirps output by the local oscillator 18. The dotted lines represent the up chirps which are transmitted during successive transmit cycles. The dashed lines represent the up chirps which are returned during successive receive cycles. While the system is being operated in the tracking mode, the approximate target range is known. The tracking mode is able to cover only a limited number of ranges (e.g., from approximately 3 to 10 kilometers in the example presented in FIG. 15). The tracking mode has high range resolution and low angular error.

The third frequency versus time graph on the right-hand side of FIG. 15 shows linear frequency-modulated continuous waves in the FMCW mode. The solid lines represent the up-chirp output by the local oscillator 18. The dotted lines represent the portion of the up chirp which is transmitted during the transmit cycle. The dashed lines represent the up chirp which is returned during the receive cycle. While the system is being operated in the FMCW mode, the approximate target range is known. The FMCW mode is able to cover less than a few (e.g., less than approximately 3 kilometers in the example presented in FIG. 15). The FMCW mode has high range resolution and low angular error.

Figure 16A:
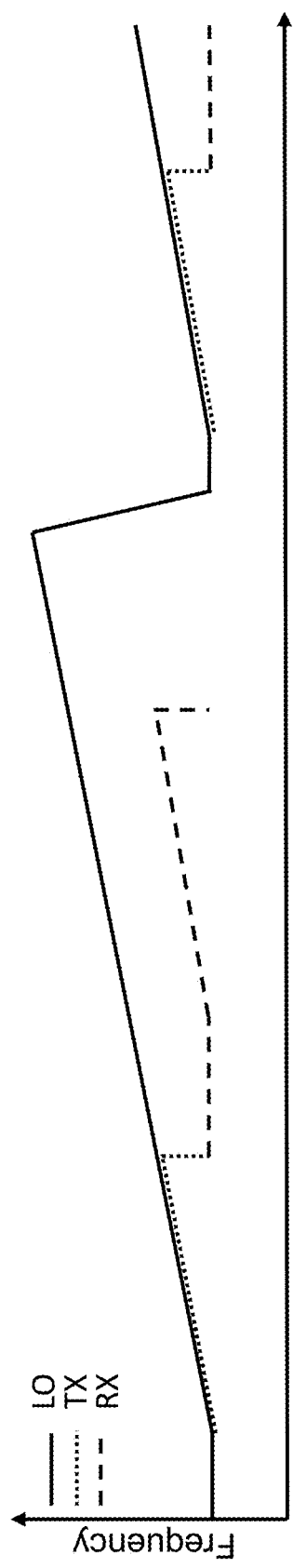
FIG. 16A is a diagram showing a frequency versus time graph for the search mode of operation for a radar system in accordance with one embodiment.

FIG. 16A is a diagram showing a frequency versus time graph for the search mode of operation for a radar system in accordance with one embodiment. The solid lines represent the linear frequency-modulated sweep signal (up chirp) output by the local oscillator 18. The dotted lines represent the portion of the up chirp which is transmitted during a transmit cycle. The dashed lines represent the up chirp which is returned during a receive cycle. As seen in FIG. 16A, the search mode includes one sequence of a transmit cycle followed by a receive cycle during each sweep cycle.

Figure 16B:
FIG. 16B is a signal timing diagram for the search mode in accordance with one proposed implementation.

FIG. 16B is a signal timing diagram for the signals depicted in FIG. 16A. The lo_sweeping sweep control signal output by microcontroller 14 to transmitter 6 controls the timing of the linear frequency-modulated sweep signal output by local oscillator 18. When the lo_sweeping sweep control signal goes high, the local oscillator 18 starts to sweep and continues to sweep until the lo_sweeping sweep control signal goes low. The local oscillator 18 stops sweeping when the lo_sweeping sweep control signal goes low.

Referring to FIG. 16B, the tx_en switch control signal output by microcontroller 14 controls the switching state of transmit switch 32. The tx_en switch control signal goes high (transmit switch 32 closes) at the same when the lo_sweeping sweep control signal goes high, but then the tx_en switch control signal goes low (transmit switch 32 opens) before the lo_sweeping sweep control signal goes low. The linear frequency-modulated sweep signal output by the local oscillator 18 passes through the transmit switch 32 and to the antenna only when the tx_en switch control signal is high.

Still referring to FIG. 16B, the rx_en switch control signal output by microcontroller 14 controls the switching state of receive switches 46. The rx_en switch control signal goes low (receive switch 32 opens) when the tx_en switch control signal goes high (transmit switch 32 closes). The rx_en switch control signal goes high (receive switch 32 closes) when the tx_en switch control signal goes low (transmit switch 32 opens).

As seen in FIG. 16B, the rx_en switch control signal is low when the tx_en switch control signal is high; the tx_en switch control signal is low when the rx_en switch control signal is high. Thus, the receive switches 46 are open when the transmit switch 32 is closed and vice versa. The return signals pass through the receive switch 46 and to the receiver 8 only when the rx_en switch control signal is high.

The return signals pass through the receive switch 46 and to the receiver 8 only when the rx_en switch control signal is high. Thus, the receive switches 46 are open when the transmit switch 32 is closed and vice versa.

Figure 17A:
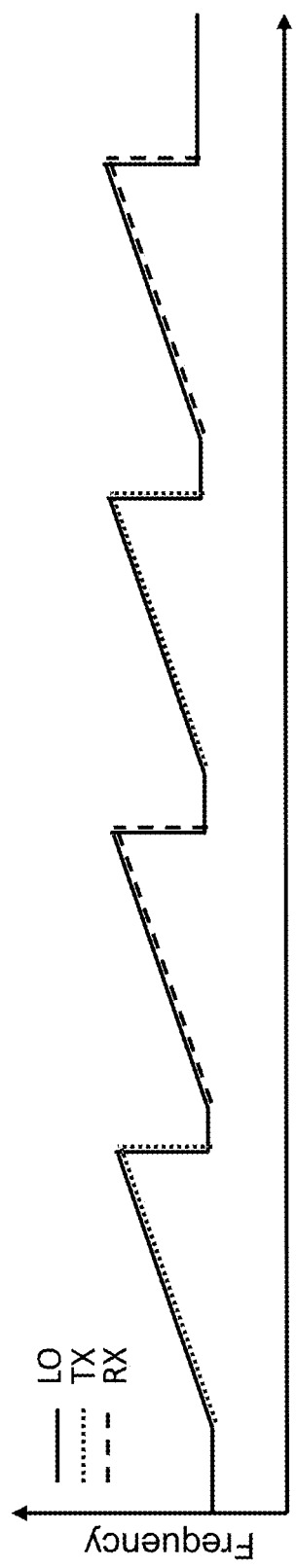
FIG. 17A is a diagram showing a frequency versus time graph for the tracking mode of operation for a radar system in accordance with one embodiment.

FIG. 17A is a diagram showing a frequency versus time graph for the tracking mode of operation for a radar system in accordance with one embodiment. The solid lines represent linear frequency sweep signals (up chirps) output by the local oscillator 18. The dotted lines represent the up chirps which are transmitted during the transmit cycles. The dashed lines represent the up chirps which are returned during the receive cycles. As seen in FIG. 17A, the tracking mode includes alternating transmit and receive cycles, the transmissions being synchronized with the odd-numbered (e.g., first, third, etc.) sweep cycles and the receptions being synchronized with the even-numbered (e.g., second, fourth, etc.) sweep cycles of local oscillator 18.

Figure 17B:
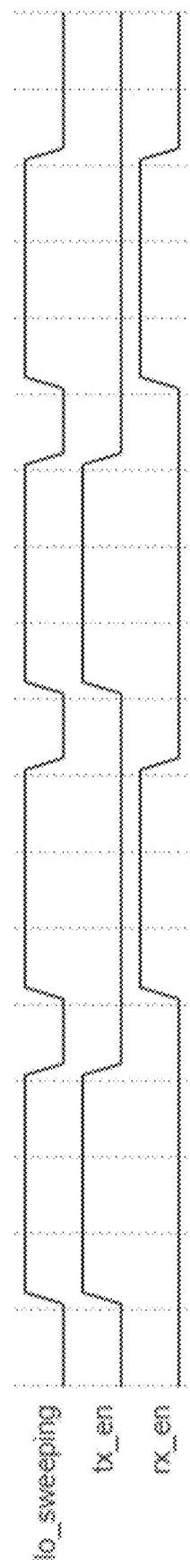
FIG. 17B is a signal timing diagram for the tracking mode in accordance with one proposed implementation.

FIG. 17B is a signal timing diagram for the signals depicted in FIG. 17A. The lo_sweeping sweep control signal output by microcontroller 14 to transmitter 6 controls the timing of the linear frequency-modulated sweep signal output by local oscillator 18 as previously described. The tx_en switch control signal output by microcontroller 14 controls the switching state of transmit switch 32 as previously described. In the tracking mode, the tx_en switch control signals go high (transmit switch 32 closes) at the same times when the odd-numbered lo_sweeping sweep control signals go high; the tx_en switch control signals go low (transmit switch 32 opens) when the odd-numbered lo_sweeping sweep control signal go low. During the even-numbered lo_sweeping sweep control signals, the tx_en switch control signals remain low (transmit switch 32 open). The high tx_en switch control signals are timed so that every other linear frequency-modulated sweep signal output by the local oscillator 18 is transmitted.

Still referring to FIG. 17B, the rx_en switch control signal output by microcontroller 14 controls the switching state of receive switches 46 as previously described. In the tracking mode, the rx_en switch control signals go high (receive switches 46 close) at the same times when the even-numbered lo_sweeping sweep control signals go high; the rx_en switch control signals go low (receive switches 46 open) when the even-numbered lo_sweeping sweep control signal go low. During the odd-numbered lo_sweeping sweep control signal, the rx_en switch control signals remain low (receive switches 46 open). When the lo_sweeping sweep control signal is low, the transmit switch 32 and the receive switches 46 are both closed.

As seen in FIG. 17B, whenever the rx_en switch control signal is high, the tx_en switch control signal is low. Conversely, whenever the tx_en switch control signal is high, the rx_en switch control signal is low. Thus, the receive switches 46 and the transmit switch 32 are never closed at the same time. The transmit signals pass through the transmit switch 32 to the antenna only when the transmit switch 32 is closed; the return signals pass through the receive switches 46 and to the receiver 8 only when the receive switches 46 are closed.

Figure 18A:
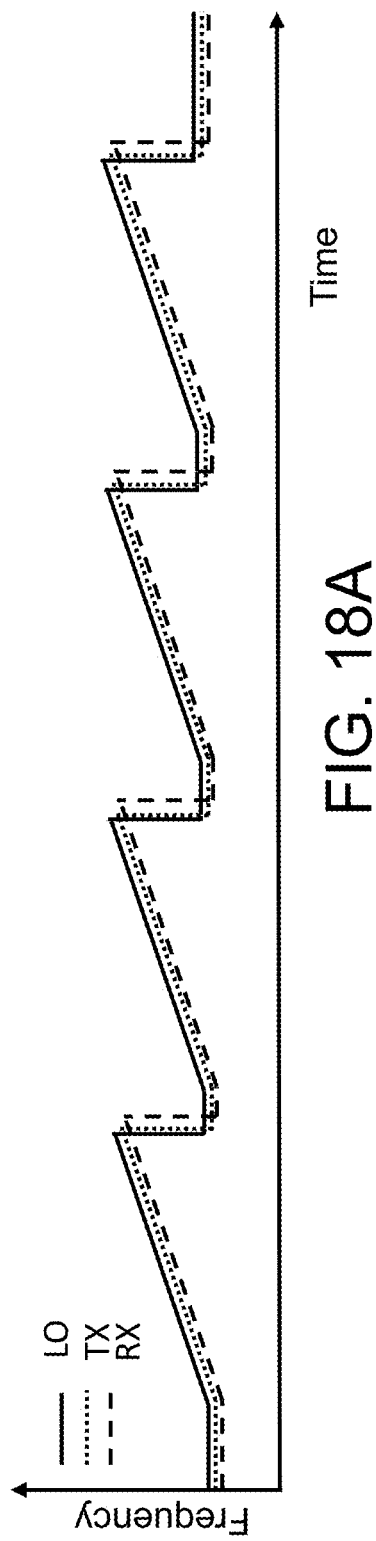
FIG. 18A is a diagram showing a frequency versus time graph for the FMCW mode of operation for a radar system in accordance with one embodiment.

FIG. 18A is a diagram showing a frequency versus time graph for the FMCW mode of operation for a radar system in accordance with one embodiment. The solid lines represent linear frequency sweep signals (up chirps) output by the local oscillator 18. The dotted lines represent the up chirps which are transmitted during the transmit cycles. The dashed lines represent the up chirps which are returned during the receive cycles. As seen in FIG. 18A, all of the linear frequency-modulated signals output by the local oscillator 18 are transmitted and all of the radar return signals are received with a small delay.

Figure 18B:
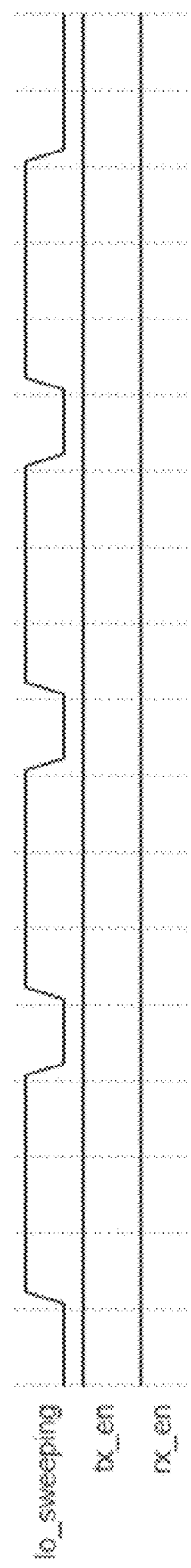
FIG. 18B is a signal timing diagram for the FMCW mode in accordance with one proposed implementation.

FIG. 18B is a signal timing diagram for the signals depicted in FIG. 18A. The lo_sweeping sweep control signal output by microcontroller 14 to transmitter 6 controls the timing of the linear frequency-modulated sweep signal output by local oscillator 18 as previously described. The tx_en switch control signal output by microcontroller 14 controls the switching state of transmit switch 32 as previously described. The rx_en switch control signal output by microcontroller 14 controls the switching state of receive switches 46 as previously described.

As seen in FIG. 18B, in the FMCW mode the tx_en and rx_en switch control signals are always high, meaning that the transmit switch 32 and receive switches 46 are continuously closed. In the FMCW mode, the gain on the amplifiers is reduced to prevent damage to sensitive front-end components. The FMCW mode is activated once the estimated range of the target is sufficiently low such that the radar can detect the target without operating the external power amplifiers 40 at full power.

In accordance with one embodiment of a method for operating the retrofitted radar system, the radar system starts in the pulsed search mode and then progresses to either the pulsed tracking mode of the FMCW mode. In a typical scan sequence, the radar system starts in the pulsed search mode, transitions to the pulsed tracking mode, and then transitions to the FMCW mode. In the pulsed search mode, the local oscillator 18 is controlled to generate successive linear frequency-modulated sweep signals and the switching states of the transmit switch 32 and receive switches 46 are controlled so that the transmit switch 32 is open when the receive switches 46 are closed and the transmit switch 32 is closed when the receive switches 46 are open during each linear frequency-modulated sweep signal. In the pulsed tracking mode, the local oscillator 18 is controlled to generate successive odd- and even-numbered linear frequency-modulated sweep signals and the switching states of the transmit switch 32 and receive switches 46 are controlled so that the transmit switch 32 is closed and the receive switches 46 are open during generation of the odd-numbered linear frequency-modulated sweep signals and so that the transmit switch 32 is open and the receive switches 46 are closed during generation of the even-numbered linear frequency-modulated sweep signals. In the FMCW mode, the local oscillator 18 is controlled to generate successive linear frequency-modulated sweep signals and the switching states of the transmit switch 32 and receive switches 46 are controlled so that the transmit and receive switches remain closed and are not opened during generation of the linear frequency-modulated sweep signals.

FIG. 9 is a flowchart identifying steps of a method 300 for retrofitting an FMCW radar transceiver 10 to also be capable of operating in either of two pulsed modes. First, the antenna 50 is disconnected from the FMCW radar transceiver 10 (step 302). Then a retrofit transmit/receive module 30 is connected to the FMCW radar transceiver 10. The connection of the retrofit transmit/receive module 30 to the FMCW radar transceiver 10 includes the following steps: connecting transmit switch 32 in transmit channel 26 of retrofit transmit/receive module 30 to transmitter 6 of the FMCW radar transceiver 10 (step 304); connecting transmit switch 32 to microcontroller 14 of the FMCW radar transceiver 10 (step 306); connecting receive switches 46 in receive channel 28 of retrofit transmit/receive module 30 to receiver 8 of the FMCW radar transceiver 10 (step 308); connecting receive switches 46 to microcontroller 14 (step 310); connecting variable attenuator 34 in transmit channel 26 to microcontroller 14 (step 312); and connecting variable attenuators 44 in receive channel 28 to microcontroller 14 (step 314). Although FIG. 9 shows steps 302 through 314 being performed in numerical order, this is but one example. In practice, steps 302 through 314 may be performed in any order.

In addition, the retrofitting method 300 includes the step of reconfiguring the microcontroller to control the switching states of the transmit and receive switches and control the attenuation levels of the variable attenuators to enable selective operation in an FMCW mode or in either the pulsed search mode or the pulsed tracking mode. Although FIG. 9 shows step 316 being performed after steps 302 through 314, this is but one example. In practice, step 316 may be performed at any time, including before the antenna 50 is disconnected from the FMCW radar transceiver 10 in step 302 or after the antenna 50 is connected to the retrofit transmit/receive module 30 in step 318. In step 318, the antenna 50 is connected to the transmit and receive channels of the retrofit transmit/receive module 30.

More specifically, the microcontroller is reconfigured to control the transmitter in the pulsed search mode to generate successive linear frequency-modulated sweep signals and control the switching states of the transmit switch and first receive switch so that the transmit switch is open when the first receive switch is closed and the transmit switch is closed when the first receive switch is open during each linear frequency-modulated sweep signal. In addition, the microcontroller is reconfigured to control the transmitter in the pulsed tracking mode to generate successive odd- and even-numbered linear frequency-modulated sweep signals and control the switching states of the transmit switch and the first receive switch so that the transmit switch is closed and the first receive switch is open during generation of the odd-numbered linear frequency-modulated sweep signals and so that the transmit switch is open and the first receive switch is closed during generation of the even-numbered linear frequency-modulated sweep signals. Lastly, the microcontroller is further configured to control the transmitter in the FMCW mode to generate successive linear frequency-modulated sweep signals and control the switching states of the transmit switch and first receive switch so that the transmit switch and first receive switch are closed during generation of the linear frequency-modulated sweep signals.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

While electronically steerable pulsed linear frequency-modulated radar systems having the capability to dynamically switch between two pulsed modes and an FMCW mode based on the estimated range of a target have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The controllers and processors disclosed herein may be implemented using hardware or hardware in combination with software. For example, a controller or control module may be implemented using configurable hardware, a programmable device, or both. Configurable hardware may comprise hardware that is configurable to perform one or more functions disclosed herein. A programmable device may comprise any device that is programmable to implement one or more functions disclosed herein. The programmable device may be configured to run software or firmware in the form of program instructions to implement one or more functions. Program instructions may be stored in any appropriate non-transitory tangible computer-readable storage medium for execution by, or transfer to, the programmable device.

The methods described and claimed herein may include steps encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

In the method claims appended hereto, any alphabetic ordering of steps is for the sole purpose of enabling subsequent short-hand references to antecedent steps and not for the purpose of limiting the scope of the claim to require that the method steps be performed in alphabetic order. Also, the terms "first time period", "second time period", and "third time period" use the modifiers first, second, and third merely to reflect the order in which the time periods are recited in the claims, not to indicate the order in which the time periods occur in the temporal domain.

The invention claimed is:

1. A method for retrofitting an electronically steerable frequency modulation continuous wave (FMCW) radar system, the method comprising:
   (a) disconnecting an antenna from an FMCW radar transceiver;
   (b) connecting a retrofit transmit/receive module comprising a plurality of single-pole double-throw (SPDT) switches and a plurality of beamforming integrated circuits (BFICs) to the FMCW radar transceiver, each BFIC being connected in series with a corresponding SPDT switch; and
   (c) connecting the antenna to the retrofit transmit/receive module,
   wherein step (b) comprises connecting one port of each SPDT switch to a transmitter and another port of each SPDT switch to a receiver of the FMCW radar transceiver; and
   wherein step (c) comprises connecting each BFIC to a respective set of antenna elements of the antenna.

2. The method as recited in claim 1, wherein step (c) further comprises connecting a respective port of the BFIC to a respective antenna element of the set of antenna elements of the antenna.

3. The method as recited in claim 2, wherein the sets of antenna elements form respective quadrants of the antenna.

4. The method as recited in claim 1, further comprising reconfiguring the microcontroller to control switching states of the SPDT switches to enable selective operation in an FMCW mode or in either of first and second pulsed modes.

5. The method as recited in claim 4, further comprising reconfiguring the microcontroller to control switching states of the SPDT switches to enable selective operation in either an FMCW elevation aperture mode or an FMCW azimuth aperture mode.

6. The method as recited in claim 4, wherein the first pulsed mode is a search mode that is capable of detecting targets at long range, the second pulsed mode is a tracking mode that is capable of detecting targets at mid-range, and the FMCW mode that is capable of detecting targets at short range.

7. A radar system comprising a FMCW radar transceiver, a retrofit transmit/receive module connected to the FMCW radar transceiver, and an antenna connected to the retrofit transmit/receive module, wherein:
   the FMCW radar transceiver comprises a transmitter, a receiver connected to the transmitter, analog-to-digital converters connected to the receiver, a digital signal processor connected to the analog-to-digital converters, and a microcontroller connected to the digital signal processor and to the transmitter;
   the antenna comprises an array of antenna elements; and
   the retrofit transmit/receive module comprises a plurality of SPDT switches and a plurality of BFICs, each BFIC being connected to a corresponding SPDT switch and to a corresponding set of antenna elements of the antenna, and one port of each SPDT switch being connected to the transmitter and another port of each SPDT switch being connected to the receiver.

8. The radar system as recited in claim 7, wherein a respective port of the BFIC is connected to a respective antenna element of the corresponding set of antenna elements of the antenna.

9. The radar system as recited in claim 8, wherein the sets of antenna elements form respective quadrants of the antenna.

10. The radar system as recited in claim 8, wherein the receiver comprises a plurality of mixers, each SPDT switch being connected to a respective mixer of the receiver.

11. The radar system as recited in claim 8, wherein each BFIC comprises a combining network connected to the corresponding SPDT switch and a plurality of BFIC modules connected to the combining network and to the respective antenna element of the corresponding set of antenna elements of the antenna.

12. The radar system as recited in claim 11, wherein each BFIC module comprises:
    a first internal SPDT switch connected to the respective port of the B FIC;
    a second internal SPDT switch connected to the combining network;
    a transmit circuit connected to one contact of the first internal SPDT switch and to one contact of the second internal SPDT switch; and
    a receive circuit connected to another contact of the first internal SPDT switch and to another contact of the second internal SPDT switch.

13. The radar system as recited in claim 12, wherein:
    the transmit circuit comprises the following circuit elements connected in series: a low-noise amplifier, a variable gain amplifier, and a variable phase shifter; and the receive circuit comprises the following circuit elements connected in series: a variable phase shifter, a variable gain amplifier, and a power amplifier.

14. The radar system as recited in claim 7, wherein the microcontroller is configured to control switching states of the SPDT switches to enable selective operation in an FMCW mode or in either of first and second pulsed modes.

15. The radar system as recited in claim 14, wherein the microcontroller is further configured to control switching states of the SPDT switches to enable selective operation in either an FMCW elevation aperture mode or an FMCW azimuth aperture mode.

16. The radar system as recited in claim 14, wherein the first pulsed mode is a search mode that is capable of detecting targets at long range, the second pulsed mode is a tracking mode that is capable of detecting targets at mid-range, and the FMCW mode that is capable of detecting targets at short range.

17. A radar system comprising a FMCW radar transceiver, a retrofit transmit/receive module connected to the FMCW radar transceiver, and an antenna connected to the retrofit transmit/receive module, wherein:

the FMCW radar transceiver comprises a transmitter, a receiver connected to the transmitter, analog-to-digital converters connected to the receiver, a digital signal processor connected to the analog-to-digital converters, and a microcontroller connected to the digital signal processor and to the transmitter;

the antenna comprises an array of antenna elements, the array of antenna elements being arranged to form first through fourth quadrants; and the retrofit transmit/receive module comprises first through fourth SPDT switches which are connected to the transmitter and to the receiver, and first through fourth BFICs which are respectively connected to the first through fourth SPDT switches and to the antenna elements of the first through fourth quadrants.

18. The radar system as recited in claim 17, wherein each of the first through fourth BFICs comprises a combining network and a plurality of BFIC modules connected to the combining network.

19. The radar system as recited in claim 18, wherein each BFIC module comprises:

a first internal SPDT switch connected to a respective port of the B FIC;

a second internal SPDT switch connected to the combining network;

a transmit circuit connected to one contact of the first internal SPDT switch and to one contact of the second internal SPDT switch; and a receive circuit connected to another contact of the first internal SPDT switch ad to another contact of the second internal SPDT switch.

20. The radar system as recited in claim 19, wherein the microcontroller is further configured to control switching states of the SPDT switches to enable selective operation in either an FMCW elevation aperture mode or an FMCW azimuth aperture mode.

\* \* \* \* \*